(12) United States Patent
Chen et al.

(10) Patent No.: US 12,073,158 B2
(45) Date of Patent: Aug. 27, 2024

(54) QUANTUM NOISE PROCESS ANALYSIS METHOD, SYSTEM, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yuqin Chen, Shenzhen (CN); Changyu Hsieh, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 397 days.

(21) Appl. No.: 17/521,162

(22) Filed: Nov. 8, 2021

(65) Prior Publication Data

US 2022/0067253 A1    Mar. 3, 2022

Related U.S. Application Data

(63) Continuation of application No. PCT/CN2021/101419, filed on Jun. 22, 2021.

(30) Foreign Application Priority Data

Aug. 28, 2020   (CN) .......................... 202010882560.X

(51) Int. Cl.
*G06F 30/33*    (2020.01)
*G06F 119/10*   (2020.01)
*G06N 10/00*    (2022.01)

(52) U.S. Cl.
CPC ............. *G06F 30/33* (2020.01); *G06N 10/00* (2019.01); *G06F 2119/10* (2020.01)

(58) Field of Classification Search
CPC ...... G06F 30/33; G06F 2119/10; G06N 10/00
(Continued)

(56) References Cited

U.S. PATENT DOCUMENTS 10,360,088 B2   7/2019  Wallman et al.
10,635,403 B1   4/2020  Pooser et al.
(Continued)

FOREIGN PATENT DOCUMENTS

CA    3104518 A1 *  4/2020  ............ G06N 10/00
CN    110210073 A    9/2019
(Continued)

OTHER PUBLICATIONS

Extended European Search Report regarding EP 21 78 5748 dated Nov. 14, 2022.
(Continued)

*Primary Examiner* — Suresh Memula
(74) *Attorney, Agent, or Firm* — Crowell & Moring LLP

(57) ABSTRACT

This application provides a quantum noise process analysis method, system, storage medium, and electronic device, which are applied in the field of quantum information processing technology. The method includes: preparing quantum initial states; respectively inputting the quantum initial states into a plurality of first circuits to obtain a plurality of first quantum output states; determining a first dynamical map eigenspectrum according to a functional correspondence between the plurality of first quantum output states and the quantum initial states; respectively inputting the quantum initial states into a plurality of second circuits to obtain a plurality of second quantum output states; determining a second dynamical map eigenspectrum according to a functional correspondence between the plurality of second quantum output states and the quantum initial states; and determining a dynamical map eigenspec-
(Continued)

trum of a quantum noise process according to the first dynamical map eigenspectrum and the second dynamical map eigenspectrum.

16 Claims, 15 Drawing Sheets

(58) Field of Classification Search
USPC .......................................................... 716/106
See application file for complete search history.

(56) References Cited

U.S. PATENT DOCUMENTS

| | | | |
|---|---|---|---|
| 10,706,366 | B2 | 7/2020 | Scheer et al. |
| 10,776,709 | B2* | 9/2020 | Shen ..................... B82Y 10/00 |
| 10,817,797 | B1* | 10/2020 | Govia ................. H03K 19/195 |
| 11,263,546 | B2* | 3/2022 | Heeres ................ G06F 9/30101 |
| 11,894,107 | B2* | 2/2024 | Setia ....................... G06N 10/00 |
| 2011/0313741 | A1* | 12/2011 | Langhoff ............... G16C 20/30 |
| | | | 703/2 |
| 2017/0308803 | A1 | 10/2017 | Wallman et al. |
| 2018/0011981 | A1 | 1/2018 | Naga et al. |
| 2018/0150761 | A1 | 5/2018 | Sarpeshkar |
| 2018/0252527 | A1 | 9/2018 | Khajavikhan et al. |
| 2020/0183768 | A1* | 6/2020 | Berkley ................. G06N 10/00 |
| 2021/0118529 | A1* | 4/2021 | Setia ....................... G16C 10/00 |
| 2021/0264310 | A1* | 8/2021 | Gottesman ............. G06N 10/00 |
| 2022/0329417 | A1* | 10/2022 | Farinholt .............. H04L 9/0858 |

FOREIGN PATENT DOCUMENTS

| | | | | |
|---|---|---|---|---|
| CN | 110516811 A | | 11/2019 | |
| CN | 110738321 A | | 1/2020 | |
| CN | 111008703 A | | 4/2020 | |
| CN | 111027703 A | | 4/2020 | |
| CN | 111510157 A | | 8/2020 | |
| CN | 111814362 A | * | 10/2020 | ............. G06F 30/20 |
| CN | 111814362 A | | 10/2020 | |
| WO | WO-2017116986 A1 | * | 7/2017 | ............. G06N 10/00 |

OTHER PUBLICATIONS

Chen et al., "Non-Markovian Noise Characterization with the Transfer Tensor Method," Physical Review Applied, vol. 13, No. 3, Mar. 28, 2019 XP055929683, PhysRevApplied 13.034045, Retrieved from the Internet: URL:https://arxiv.org/9df/1905.10941,pdf>.
Helsen et al., "Spectral Quantum Tomography," Arxiv.org, Cornell University Library, Cornell University Ithaca, NY, Mar. 30, 2019, XP081451380, Retrieved from the Internet: URL:https://arxiv.org/pdf/1905.10941,pdf>.
International Search Report with concise English explanation and Written Opinion for PCT/CN2021/101419 dated Sep. 26, 2021.
Chinese Office Action with concise English translation for CN202010882560.X dated Nov. 3, 2020.
Tian et al., "Quantum logic operations in Non-Markov Environments," Journal of Hunan University of Arts and Science (natural Science Edition) vol. 26 No.2, Jun. 15, 2014, pp. 1-6.
Decision to Grant a Patent issued on Japanese Application 2021-562866 on Nov. 25, 2022, translation, 2 pages.

* cited by examiner

US 12,073,158 B2

QUANTUM NOISE PROCESS ANALYSIS METHOD, SYSTEM, STORAGE MEDIUM, AND ELECTRONIC DEVICE

RELATED APPLICATION

This application is a continuation application of PCT Patent Application No. PCT/CN2021/101419, filed on Jun. 22, 2021, which claims priority to Chinese Patent Application No. 202010882560.X, filed with the National Intellectual Property Administration, PRC on Aug. 28, 2020, both of which are incorporated herein by reference in their entireties.

FIELD OF THE TECHNOLOGY

This application relates to the field of quantum information processing technology, and in particular, to a quantum noise process analysis method, system, storage medium, and electronic device.

BACKGROUND OF THE DISCLOSURE

Currently, quantum information processing technologies are a research hotspot in the fields of physics and information science. It has great application value and prospects in the fields of information security such as military, national defense, and finance, and not only can be used for national-level secret communication in the fields of military and national defense, but also can be used in the fields and departments such government, telecommunications, industry and commerce, and finance. One of the methods, quantum process tomography, is mainly to reconstruct a mathematical description of the quantum noise process through a series of measurement processes for a set of standard quantum states input through the noise channel. Information the dynamical map of the quantum noise process can be extracted in the quantum process tomography process.

The quantum noise process is a quantum information pollution process caused by the interaction between a quantum system or quantum device with a bath or by the imperfection in quantum control. This process is a channel represented by using a super-operator, and if the process is expanded to a higher dimensionality, the process may be represented by using a matrix. However, existing quantum process tomographies are mainly applicable to quantum noise processes of Markovian noise channels, but fail to provide an effective detection method and quantitative analysis method for non-Markovian noise channels.

The present disclosure describes embodiments for analyzing quantum noise process, addressing at least one of the problems/issues discussed above, providing an effective detection method and quantitative analysis method for analyzing quantum noise, thus improving the field of quantum information processing technology.

SUMMARY

Embodiments of this application provide an image processing method and apparatus and a related device for analyzing quantum noise process.

The present disclosure describes a method for analyzing quantum noise process. The method includes preparing, by a device, a set of quantum initial states. The device includes a memory storing instructions and a processor in communication with the memory. The method also includes respectively inputting, by the device, the set of quantum initial states into a plurality of first circuits to obtain a plurality of first quantum output states, each of the first circuits comprising at least one noise evolution gate and at least one projection test gate, each of the at least one projection test gate corresponding to each of the at least one noise evolution gate, and different first circuits comprising different numbers of noise evolution gates; determining, by the device, a first dynamical map eigenspectrum comprising a first error according to a functional correspondence of a dynamical map eigenspectrum based on a quantum noise process between the plurality of first quantum output states and the set of quantum initial states; respectively inputting, by the device, the set of quantum initial states into a plurality of second circuits to obtain a plurality of second quantum output states, each of the second circuits comprising at least one noise evolution gate and at least one dual projection test gate, each of the at least one dual projection test gate corresponding to each of the at least one noise evolution gate, and different second circuits comprising different numbers of noise evolution gates; determining, by the device, a second dynamical map eigenspectrum comprising a second error according to a functional correspondence of the dynamical map eigenspectrum based on the quantum noise process between the plurality of second quantum output states and the set of quantum initial states; and determining, by the device, the dynamical map eigenspectrum of the quantum noise process according to the first dynamical map eigenspectrum and the second dynamical map eigenspectrum.

The present disclosure describes an apparatus for analyzing quantum noise process. The apparatus includes a memory storing instructions; and a processor in communication with the memory. When the processor executes the instructions, the processor is configured to cause the apparatus to perform: preparing, by a device comprising a memory storing instructions and a processor in communication with the memory, a set of quantum initial states, respectively inputting, by the device, the set of quantum initial states into a plurality of first circuits to obtain a plurality of first quantum output states, each of the first circuits comprising at least one noise evolution gate and at least one projection test gate, each of the at least one projection test gate corresponding to each of the at least one noise evolution gate, and different first circuits comprising different numbers of noise evolution gates, determining, by the device, a first dynamical map eigenspectrum comprising a first error according to a functional correspondence of a dynamical map eigenspectrum based on a quantum noise process between the plurality of first quantum output states and the set of quantum initial states, respectively inputting, by the device, the set of quantum initial states into a plurality of second circuits to obtain a plurality of second quantum output states, each of the second circuits comprising at least one noise evolution gate and at least one dual projection test gate, each of the at least one dual projection test gate corresponding to each of the at least one noise evolution gate, and different second circuits comprising different numbers of noise evolution gates, determining, by the device, a second dynamical map eigenspectrum comprising a second error according to a functional correspondence of the dynamical map eigenspectrum based on the quantum noise process between the plurality of second quantum output states and the set of quantum initial states, and determining, by the device, the dynamical map eigenspectrum of the quantum noise process according to the first dynamical map eigenspectrum and the second dynamical map eigenspectrum.

The present disclosure describes a non-transitory computer-readable storage medium, storing computer-readable instructions. The computer-readable instructions, when executed by a processor, are configured to cause the processor to perform: preparing, by a device comprising a memory storing instructions and a processor in communication with the memory, a set of quantum initial states; respectively inputting, by the device, the set of quantum initial states into a plurality of first circuits to obtain a plurality of first quantum output states, each of the first circuits comprising at least one noise evolution gate and at least one projection test gate, each of the at least one projection test gate corresponding to each of the at least one noise evolution gate, and different first circuits comprising different numbers of noise evolution gates; determining, by the device, a first dynamical map eigenspectrum comprising a first error according to a functional correspondence of a dynamical map eigenspectrum based on a quantum noise process between the plurality of first quantum output states and the set of quantum initial states; respectively inputting, by the device, the set of quantum initial states into a plurality of second circuits to obtain a plurality of second quantum output states, each of the second circuits comprising at least one noise evolution gate and at least one dual projection test gate, each of the at least one dual projection test gate corresponding to each of the at least one noise evolution gate, and different second circuits comprising different numbers of noise evolution gates; determining, by the device, a second dynamical map eigenspectrum comprising a second error according to a functional correspondence of the dynamical map eigenspectrum based on the quantum noise process between the plurality of second quantum output states and the set of quantum initial states; and determining, by the device, the dynamical map eigenspectrum of the quantum noise process according to the first dynamical map eigenspectrum and the second dynamical map eigenspectrum.

Another aspect of the embodiments of this application provides a quantum noise process analysis method, including:

preparing a set of quantum initial states;

respectively inputting the prepared quantum initial states into a plurality of first circuits to obtain a plurality of first quantum output states, the first circuits each including at least one noise evolution gate and a projection test gate corresponding to each noise evolution gate, and different first circuits including different numbers of noise evolution gates;

determining a dynamical map eigenspectrum including a first error according to a functional correspondence of a dynamical map eigenspectrum based on a quantum noise process between the plurality of first quantum output states and the quantum initial states;

respectively inputting the prepared quantum initial states into a plurality of second circuits to obtain a plurality of second quantum output states, the second circuits each including at least one noise evolution gate and a dual projection test gate corresponding to each noise evolution gate, and different second circuits including different numbers of noise evolution gates;

determining a dynamical map eigenspectrum including a second error according to a functional correspondence of the dynamical map eigenspectrum based on the quantum noise process between the plurality of second quantum output states and the quantum initial states; and determining the dynamical map eigenspectrum of the quantum noise process according to the dynamical map eigenspectrum including the first error and the dynamical map eigenspectrum including the second error.

Another aspect of the embodiments of this application provides a quantum noise process analysis system, including:

a preparation unit, configured to prepare a set of quantum initial states;

a testing unit, configured to respectively input the prepared quantum initial states into a plurality of first circuits to obtain a plurality of first quantum output states, the first circuits each including at least one noise evolution gate and a projection test gate corresponding to each noise evolution gate, and different first circuits including different numbers of noise evolution gates;

an error eigenspectrum unit, configured to determine a dynamical map eigenspectrum including a first error according to a functional correspondence of a dynamical map eigenspectrum based on a quantum noise process between the plurality of first quantum output states and the quantum initial states;

the testing unit being configured to respectively input the prepared quantum initial states into a plurality of second circuits to obtain a plurality of second quantum output states, the second circuits each including at least one noise evolution gate and a dual projection test gate corresponding to each noise evolution gate, and different second circuits including different numbers of noise evolution gates;

the error eigenspectrum unit being further configured to determine a dynamical map eigenspectrum including a second error according to a functional correspondence of the dynamical map eigenspectrum based on the quantum noise process between the plurality of second quantum output states and the quantum initial states; and an analysis unit, configured to determine the dynamical map eigenspectrum of the quantum noise process according to the dynamical map eigenspectrum including the first error and the dynamical map eigenspectrum including the second error.

Another aspect of the embodiments of this application further provides a computer-readable storage medium, storing a computer program, the computer program being configured to be loaded by a processor to execute the quantum noise process analysis method provided by the embodiments of this application.

Another aspect of the embodiments of this application further provides an electronic device, including: a processor and a memory.

The memory is configured to store a computer program, and the processor being configured to execute the computer program stored in the memory to implement the quantum noise process analysis method provided in the embodiments of this application.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

The technical solutions in embodiments of this application are clearly described in the following with reference to the accompanying drawings in the embodiments of this application. Apparently, the described embodiments are merely some embodiments of this application rather than all of the embodiments. All other embodiments obtained by a person of ordinary skill in the art based on the embodiments of this application without making creative efforts shall fall within the protection scope of this application.

In the specification, claims, and accompanying drawings of this application, the terms "first", "second", "third", "fourth", and so on (if existing) are intended to distinguish between similar objects rather than describe a specific order or sequence. It may be understood that the data termed in such a way is interchangeable in proper circumstances, so that the embodiments of this application described herein for example, can be implemented in other orders than the order illustrated or described herein. Moreover, the terms "include", "comprise" and any other variations mean to cover the non-exclusive inclusion. For example, a process, method, system, product, or device that includes a list of operations or units is not necessarily limited to those expressly listed steps or units, but may include other steps or units not expressly listed or inherent to such a process, method, system, product, or device. In the following description, the term "plurality" refers to at least two.

Figure 1A:
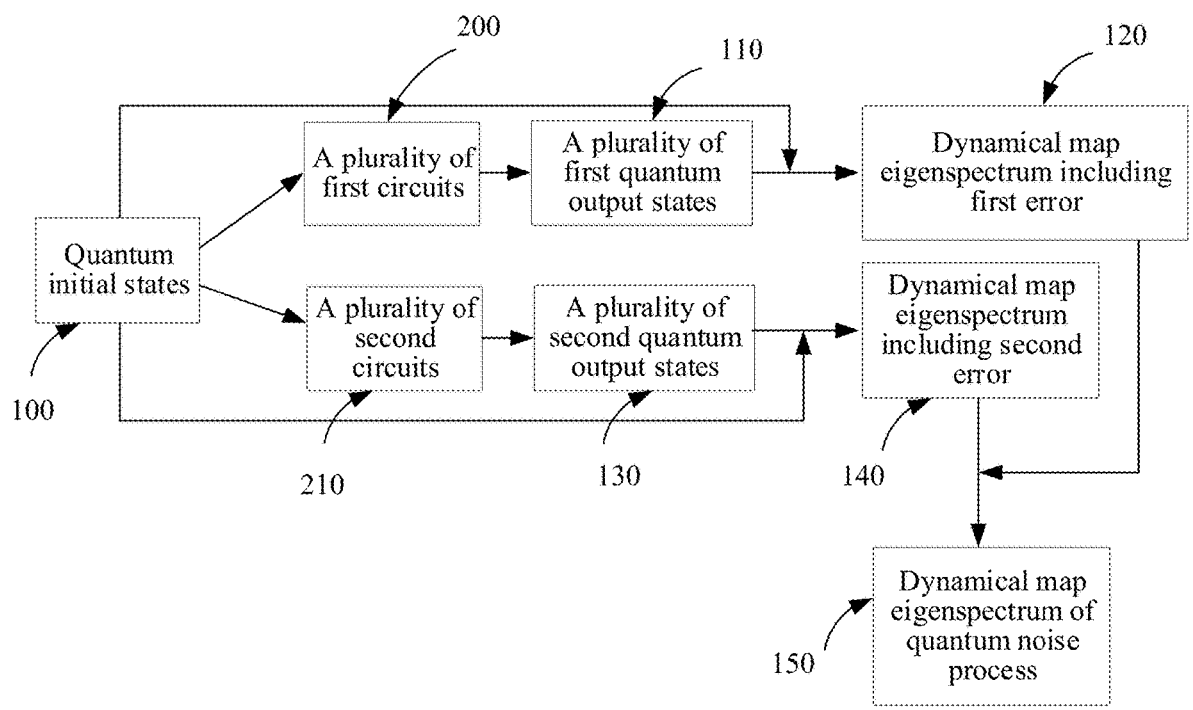
FIG. 1a is a schematic diagram of a quantum noise process analysis method according to an embodiment of this application.

The embodiments of the application provide a quantum noise process analysis method, which can be used to analyze noise in a quantum system, for example, to analyze a non-Markovian quantum noise process. As shown in FIG. 1a, the quantum noise process analysis system may implement noise analysis by performing the following steps:

preparing a set of quantum initial states 100; respectively inputting the prepared quantum initial states 100 into a plurality of first circuits 200 to obtain a plurality of first quantum output states 110, the first circuits 200 each including at least one noise evolution gate and a projection test gate corresponding to each noise evolution gate, and different first circuits 200 including different numbers of noise evolution gates; determining a dynamical map eigenspectrum 120 including a first error according to a functional correspondence of the dynamical map eigenspectrum based on the quantum noise process between the plurality of first quantum output states 110 and the quantum initial states 100; respectively inputting the prepared quantum initial states 100 into a plurality of second circuits 210 to obtain a plurality of second quantum output states 130, the second circuits 210 each including at least one noise evolution gate and a dual projection test gate corresponding to each noise evolution gate, and different second circuits 210 including different numbers of noise evolution gates; determining a dynamical map eigenspectrum 140 including a second error according to a functional correspondence of the dynamical map eigenspectrum based on the quantum noise process between the plurality of second quantum output states 130 and the quantum initial states 100; and determining a dynamical map eigenspectrum 150 of the quantum noise process according to the dynamical map eigenspectrum 120 including the first error and the dynamical map eigenspectrum 140 including the second error, so as to analyze the quantum noise process.

In various embodiments in the present disclosure, a dual projection test gate may include two projection test gates in a sequential manner.

In this way, because the numbers of projection test gates included in the first circuit 200 and the second circuit 210 are different, errors caused in the analysis of the quantum initial state 100 in the evolution process are also different, that is, the first error and the second error are different. Then, an error-eliminated dynamical map eigenspectrum 150 may be obtained according to the dynamical map eigenspectrum 120 including the first error and the dynamical map eigenspectrum 140 including the second error, so that the quantum noise process can be analyzed more accurately according to the error-eliminated dynamical map eigenspectrum 150, and noise in the quantum system can be monitored more accurately, thereby achieving accurate and targeted regulation of the quantum system.

In some implementations, a dynamical map eigenspectrum 120 including a first error, which is determined according to a functional correspondence of the dynamical map eigenspectrum based on the quantum noise process between the plurality of first quantum output states 110 and the quantum initial states 100, may be referred as a dynamical map eigenspectrum of a first error 120 or a dynamical map eigenspectrum representing a first error 120. A dynamical map eigenspectrum 140 including a second error, which is determined according to a functional correspondence of the dynamical map eigenspectrum based on the quantum noise process between the plurality of second quantum output states 130 and the quantum initial states 100, may be referred as a dynamical map eigenspectrum of a second error 140 or a dynamical map eigenspectrum representing a second error 140. A dynamical map eigenspectrum of the quantum noise process 150 may be determined according to the dynamical map eigenspectrum of the first error 120 and the dynamical map eigenspectrum of the second error 140, so that the quantum noise process can be analyzed more accurately according to the error-eliminated dynamical map eigenspectrum 150, and noise in the quantum system can be monitored more accurately, thereby achieving accurate and targeted regulation of the quantum system.

Figure 1B:
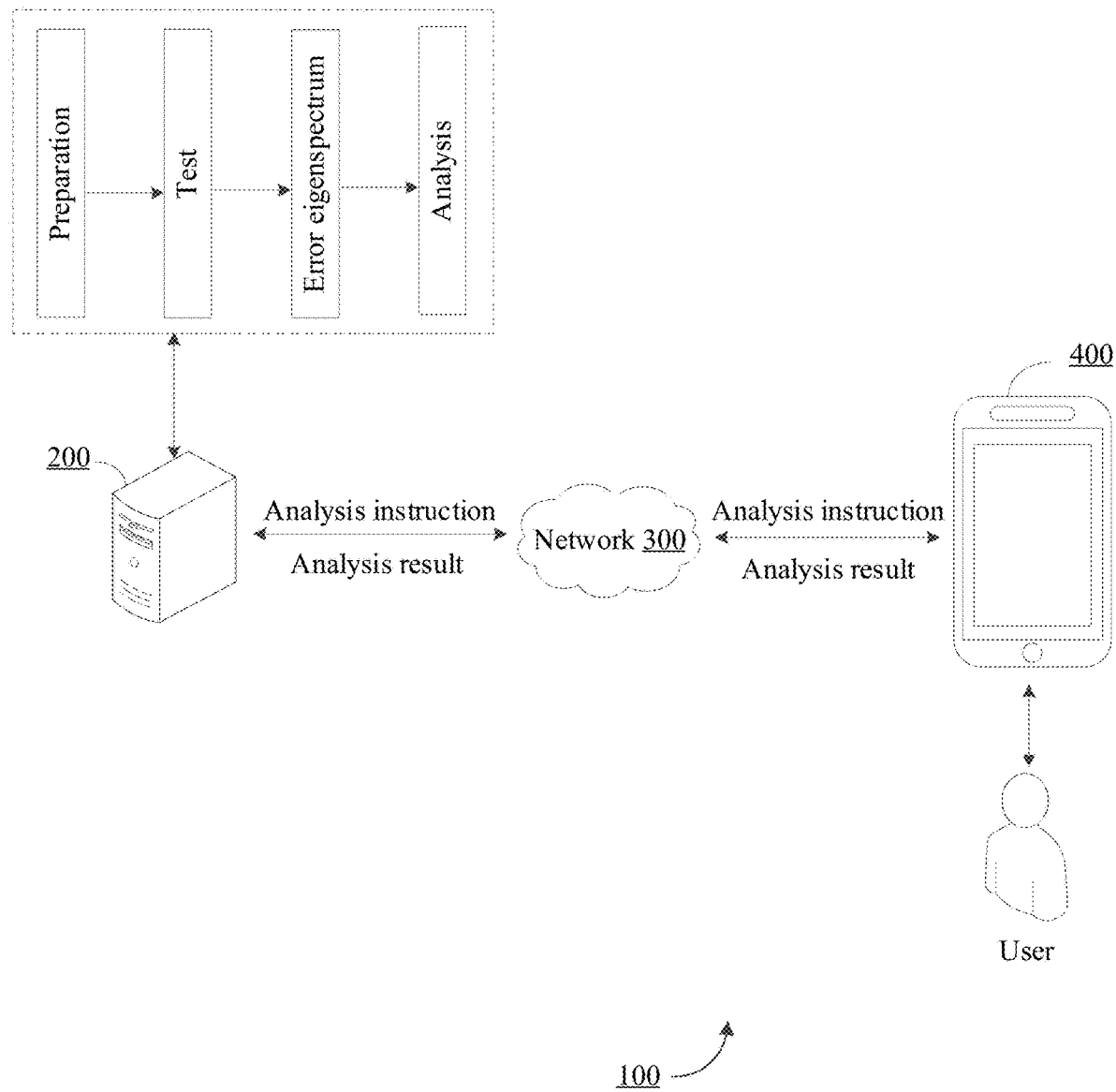
FIG. 1b is a schematic structural diagram showing implementation of a quantum noise process analysis method according to an embodiment of this application.

The following describes exemplary applications of the electronic devices provided in the embodiments of this application. The electronic device provided in the embodiments of this application can be implemented as various types of terminal devices or as servers. As shown in FIG. 1b, a terminal device 400 is connected to a server 200 through a network 300, where the network 300 may be a wide area network or a local area network or a combination of the two.

In some embodiments, taking a terminal device as an example of the electronic device, the quantum noise process analysis method provided in the embodiments of this application may be implemented by the terminal device. For example, the terminal device 400 may implement the various steps shown in FIG. 1a based on its own computing capability.

In some embodiments, taking a server as an example of the electronic device, the quantum noise process analysis method provided in the embodiments of this application may also be implemented by the server. For example, the server 200 may implement the various steps shown in FIG. 1a based on its own computing capability.

In some embodiments, the quantum noise process analysis method provided in the embodiments of this application may also be implemented by a terminal device and a server in cooperation. For example, the terminal device 400 may send an analysis instruction to the server 200, so that the server 200 implements the steps shown in FIG. 1a according to the received analysis instruction. The server 200 may also send an analysis result to the terminal device 400 as a response to the analysis instruction. In this way, the terminal device 400 can make use of the computing capability of the server 200 to implement quantum noise process analysis.

In some embodiments, the terminal device 400 or the server 200 can implement the quantum noise process analysis method provided by the embodiments of this application by running a computer program. For example, the computer program can be a native program or software module in an operating system; or can be a native application, which is a program that can be run only after being installed in the operating system. All in all, the above-mentioned computer program may be any form of application, module, or plug-in.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device 400 may be a smartphone, a notebook computer, a desktop computer, a special terminal device dedicated for quantum analysis, or the like, but this application is not limited thereto. The terminal device and the server can be directly or indirectly connected through wired or wireless communication, which is not limited in the embodiments of this application.

Figure 2:
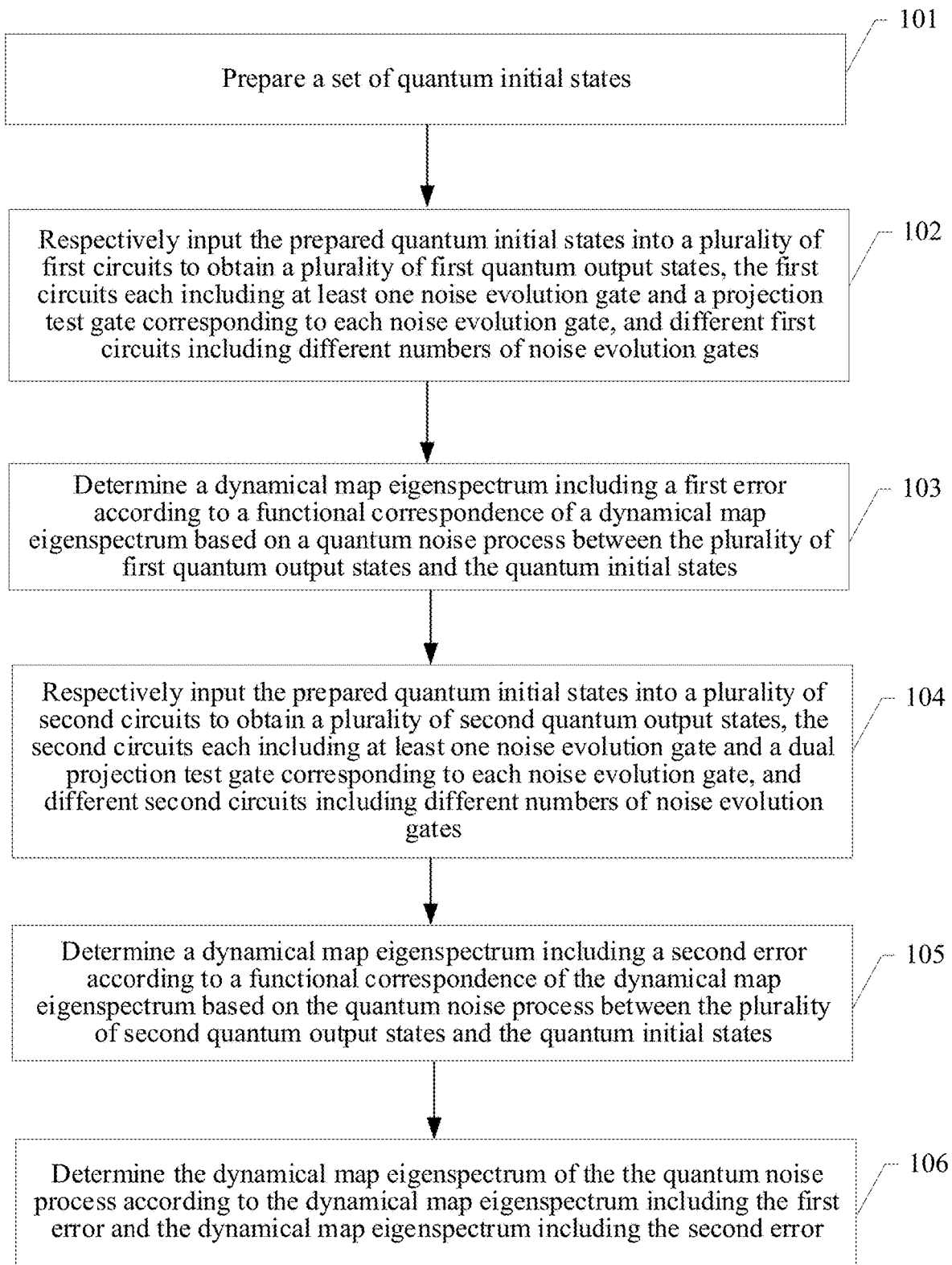
FIG. 2 is a flowchart of a quantum noise process analysis method according to an embodiment of this application.

An embodiment of this application provides a quantum noise process analysis method, which may be a method executed by a quantum noise process analysis system. FIG. 2 is a flowchart of the method, including the following steps:

Step 101: Prepare a set of quantum initial states.

It can be understood that quantum information processing refers to the processing of information in a quantum system. The quantum system is a part of the entire universe and its motion law follows quantum mechanics. All the information of a quantum system can be represented by a quantum state. In this embodiment, in order to analyze the quantum noise process in the quantum system, first a set of quantum states in initial states (i.e., quantum initial states) is prepared. For example, a Pauli matrix (i.e., Pauli basis) may be selected to prepare the quantum initial states. In another implementation, a Pauli matrix (i.e., Pauli basis) may be selected to represent/describe a quantum state, for example, a quantum initial state.

Step 102: Respectively input the prepared quantum initial states into a plurality of first circuits to obtain a plurality of first quantum output states, the first circuits each including at least one noise evolution gate and a projection test gate corresponding to each noise evolution gate, and different first circuits including different numbers of noise evolution gates.

In some implementations, step 102 may include respectively inputting the prepared set of quantum initial states into a plurality of first circuits to obtain a plurality of first quantum output states. For each first circuit of the plurality of first circuits, each first circuit includes at least one noise evolution gate and at least one projection test gate; and each of the at least one projection test gate may correspond to each of the at least one noise evolution gate. For each first circuit of the first circuits, a number of the at least one noise evolution gate and a number of the at least one projection test gate may be the same. Different first circuits may include different numbers of at least one noise evolution gate, and different first circuits may include different numbers of at least one projection test gate.

For example, at each evolutionary moment of a plurality of evolutionary moments, the prepared quantum initial states may be respectively inputted into the plurality of first circuits to obtain a plurality of first quantum output states at each evolutionary moment. In this way, a plurality of sets of first quantum output states can be obtained. Each set of first quantum output states corresponds to one evolutionary moment, and includes quantum output states obtained after the initial quantum states have respectively passed through the plurality of first circuits.

Time intervals between adjacent evolutionary moments may be the same, that is, the plurality of evolutionary moments may be $t_i = \delta t, 2\delta t, \ldots, N\delta t$. The noise evolution gate refers to a noise channel that evolves over time, and the noise evolution gate at each evolutionary moment may be represented by a dynamical evolution map. The projection test gate is mainly used for performing a projection test on the noise channel in a certain direction. The projection test gate at each evolutionary moment may be represented by a projection measurement map.

In a Markovian quantum noise process, the first quantum output state output through the first circuit at any evolutionary moment for the quantum initial state is only related to the first quantum output state output through the first circuit at the previous evolutionary moment; in a non-Markovian quantum noise process, the first quantum output state output through the first circuit at any evolutionary moment for the quantum initial state is related to the first quantum output states output through the first circuit at a plurality of previous evolutionary moments. The noise evolution gate in this embodiment may be a non-Markovian quantum noise channel.

Step 103: Determine a dynamical map eigenspectrum including a first error according to a functional correspondence of a dynamical map eigenspectrum based on a quantum noise process between the plurality of first quantum output states and the quantum initial states. The functional correspondence may be a functional correspondence of the dynamical map eigenspectrum based on the quantum noise process between the plurality of first quantum output states and information used for preparing the quantum initial states.

Because the functional correspondence of the dynamical map eigenspectrum based on the quantum noise process exists between each first quantum output state and the information used for preparing the quantum initial state, and the known quantum initial states and a plurality of first quantum output states can be obtained through the above steps 101 and 102, the dynamical map eigenspectrum including the first error can then be solved. Because in the above step 102, in the process of obtaining the first quantum output states, the quantum initial states have passed through at least one set of noise evolution gates and projection test gates (that is, at least one noise evolution gate and a projection test gate corresponding to each noise evolution gate), in which a test error of at least one projection test gate occurs, the dynamical map eigenspectrum determined by this step includes the test error, that is, the first error.

If a plurality of sets of first quantum output states are obtained in the above step 102, which respectively correspond to a plurality of evolutionary moments, then the dynamical map eigenspectra including the first error that respectively correspond to the plurality of evolutionary moments can be obtained through this step 103.

The dynamical map mainly refers to Trace-Preserving Completely Positive map (TPCP), where trace-preserving means that the trace of the quantum state density operator in the dynamical evolution process remains unchanged, "completely positive" means that if the density operator is non-negative, any part of the dynamical map applied to the density operator will remain non-negative.

Step 104: Respectively input the prepared quantum initial states into a plurality of second circuits to obtain a plurality of second quantum output states, the second circuits each including at least one noise evolution gate and a dual projection test gate corresponding to each noise evolution gate, and different second circuits including different numbers of noise evolution gates.

In some implementations, step 104 may include respectively inputting the prepared set of quantum initial states into a plurality of second circuits to obtain a plurality of second quantum output states. For each second circuit of the plurality of second circuits, each second circuit includes at least one noise evolution gate and at least one dual projection test gate; and each of the at least one dual projection test gate may correspond to each of the at least one noise evolution gate. For each second circuit of the second circuits, a number of the at least one noise evolution gate and a number of the at least one dual projection test gate may be the same. Different second circuits may include different numbers of at least one noise evolution gate, and different second circuits may include different numbers of at least one dual projection test gate.

For example, at each evolutionary moment of a plurality of evolutionary moments, the prepared quantum initial states may be respectively inputted into the plurality of second circuits to obtain a plurality of second quantum output states at each evolutionary moment. In this way, a plurality of sets of second quantum output states can be obtained. Each set of second quantum output states corresponds to one evolutionary moment, and includes quantum output states obtained after the initial quantum states have respectively passed through the plurality of second circuits.

In a non-Markovian quantum noise process, the second quantum output state output through the second circuit at any evolutionary moment for the quantum initial state is related to the second quantum output states output through the second circuit at a plurality of previous evolutionary moments.

Step 105: Determine a dynamical map eigenspectrum including a second error according to a functional correspondence of the dynamical map eigenspectrum based on the quantum noise process between the plurality of second quantum output states and the quantum initial states. The functional correspondence may be a functional correspondence of the dynamical map eigenspectrum based on the quantum noise process between the plurality of second quantum output states and information used for preparing the quantum initial states.

Because the functional correspondence of the dynamical map eigenspectrum based on the quantum noise process exists between each second quantum output state and the quantum initial state, and the known quantum initial states and a plurality of second quantum output states can be obtained through the above steps 101 and 104, the dynamical map eigenspectrum including the second error can then be solved. Because in the above step 104, in the process of obtaining the second quantum output states, the quantum initial states have passed through at least one set of noise evolution gates and dual projection test gates (that is, at least one noise evolution gate and a dual projection test gate corresponding to each noise evolution gate), in which a test error of at least two projection test gates is involved, the dynamical map eigenspectrum determined by this step includes the test error, that is, the second error.

If a plurality of sets of second quantum output states are obtained in the above step 104, which respectively correspond to a plurality of evolutionary moments, then the dynamical map eigenspectra including the second error that respectively correspond to the plurality of evolutionary moments can be obtained through this step 105.

Step 106: Determine the dynamical map eigenspectrum of the quantum noise process according to the dynamical map eigenspectrum including the first error and the dynamical map eigenspectrum including the second error.

For example, certain calculation is performed on the dynamical map eigenspectrum including the first error and the dynamical map eigenspectrum including the second error. In this way, the finally obtained dynamical map eigenspectrum of the quantum noise process does not include any error, and the analysis of the quantum noise process can be performed according to this dynamical map eigenspectrum. If the dynamical map eigenspectra including the first error corresponding to a plurality of evolutionary moments are obtained in the above step 103, and the dynamical map eigenspectra including the second error corresponding to the plurality of evolutionary moments are obtained in the above step 105, in this step 106, for each evolutionary moment, calculation is performed on the dynamical map eigenspectrum including the first error corresponding to the evolutionary moment and the dynamical map eigenspectrum including the second error corresponding to the evolutionary moment, so as to obtain the dynamical map eigenspectrum of the quantum noise process corresponding to the evolutionary moment.

The above-mentioned steps 102 to 103 and steps 104 to 105 are not limited to a particular order, but may be executed simultaneously or sequentially. FIG. 2 merely shows one of the application examples.

Figure 3A:
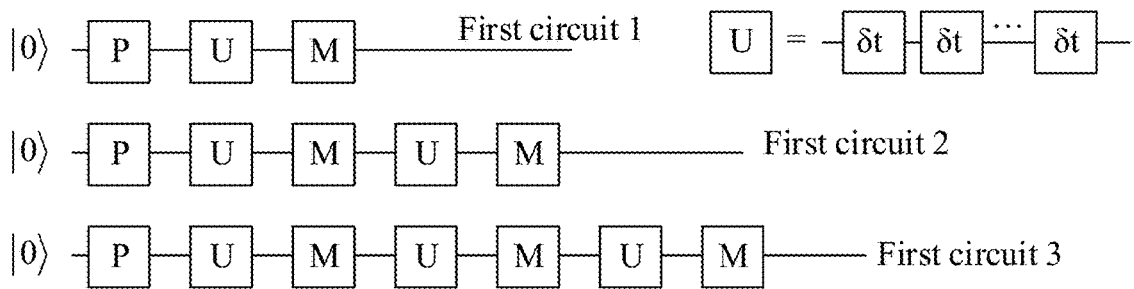
FIG. 3a is a schematic diagram of a plurality of first circuits in an embodiment of this application.

In an implementation, for example, as shown in FIG. 3a, the prepared quantum initial states P are inputted to three first circuits respectively. A first circuit 1 includes a noise evolution gate U and a corresponding projection test gate M. The first circuit 1 outputs a first quantum output state 1. A first circuit 2 includes two noise evolution gates U and a projection test gate M corresponding to each noise evolution gate U. The first circuit 2 outputs a first quantum output state 2. A first circuit 3 includes three noise evolution gates U and a projection test gate M corresponding to each noise evolution gate U. The first circuit 3 outputs a first quantum output state 3.

Figure 3B:
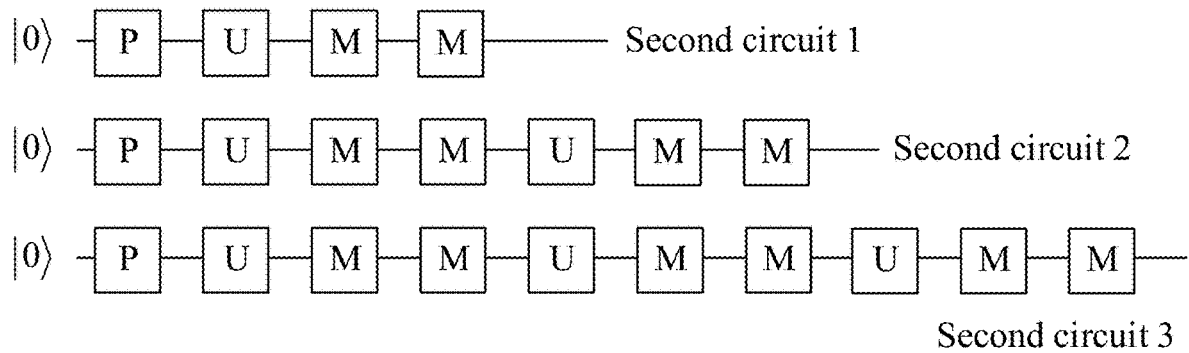
FIG. 3b is a schematic diagram of a plurality of second circuits in an embodiment of this application.

For example, as shown in FIG. 3b, the prepared quantum initial states P are inputted to three second circuits respectively. A second circuit 1 includes a noise evolution gate U and a corresponding dual projection test gate MM (that is, two projection test gates M). The second circuit 1 outputs a second quantum output state 1. A second circuit 2 includes two noise evolution gates U and a dual projection test gate MM corresponding to each noise evolution gate U. The second circuit 2 outputs a second quantum output state 2. A second circuit 3 includes three noise evolution gates U and a dual projection test gate MM corresponding to each noise evolution gate U. The second circuit 3 outputs a second quantum output state 3.

In the actual analysis process, the noise evolution gate U may be set as a non-Markovian quantum noise channel or a Markovian quantum noise channel, and may be a Pauli noise channel or a non-Pauli noise channel, and through actual analysis, the effects of different types of noise channels on the analysis of the quantum noise process is determined. And for each evolutionary moment ti, such as δt, 2δt, ..., nδt, the prepared quantum initial states need to be inputted into the first circuits and the second circuits respectively. The noise evolution gates U and the projection test gates M in the circuits shown in FIG. 3a and FIG. 3b may noise evolution gates U and projection test gates M at any evolutionary moment.

Each first quantum output state may be represented by a signal function $g_{ti}(k)$, where ti represents the evolutionary moment, and k is used to distinguish the first quantum output states outputted by different circuits. In a Markovian quantum noise process, a quantum output state obtained from a circuit at any evolutionary moment is only related to a quantum output state obtained from the circuit at the previous evolutionary moment; in a non-Markovian quantum noise process, a quantum output state obtained from a circuit at any evolutionary moment is related to quantum output states obtained from the circuit at a plurality of previous evolutionary moments. In this embodiment, the non-Markovian quantum noise process is illustrated by an example. It is assumed that at a certain evolutionary moment, the first quantum output states obtained by the three first circuits shown in FIG. 3a are respectively $g_{ti}(1)$, $g_{ti}(2)$, and $g_{ti}(3)$, which may be expressed as formula 1-1 below, where N represents a super-operator, $N_{meas}$ represents the test error of the projection test gate, $N_{prep}$ represents the preparation error of the quantum initial state, Λ represents a dynamical map of the noise evolution gate, $M_v$ is a projection test map of the projection test gate; $P_v$ is a Pauli matrix, where the quantum initial states are prepared mainly by selecting a Pauli matrix $P_v$.

$$g_{ti}(k) = \frac{1}{2}\sum_{v=1}^{N} Tr\left[P_v(N_{meas} \circ M_v \circ \Lambda)^k \circ N_{prep}(P_v)\right] \quad (1\text{-}1)$$

Taking a single-qubit quantum state as an example, $$g_{ti}(k) = \sum_{v=1}^{3} R_{vv},$$

where $R_{vv}$ is a Pauli transition matrix, which can be calculated according to the Pauli matrix, and can be expressed as formula 1-2 below:

$$R_{vv} = \frac{1}{2} Tr[P_v \ldots \Lambda_t[M_v[\Lambda_t[P_v]]]] \quad (1\text{-}2)$$

where the Pauli matrix $P_v = |v_+\rangle\langle v_+| - |v_-\rangle\langle v_-|$, $|v_+\rangle$ is an eigenstate of the Pauli matrix $P_v$, and $M_v[\rho]$ is a projection measurement map in $P_v$ direction. The Pauli transition matrix corresponding to the first two first circuits shown in FIG. 3a can be obtained by using $Tr[P_v\Lambda(|v_+\rangle\langle v_+|)] = -Tr[P_v\Lambda(|v_-\rangle\langle v_-|)]$, and may be expressed as formula 1-3 and formula 1-4 below:

$$R_{vv}^{(1)} = Tr[P_v\Lambda_{ti}[|v_+\rangle\langle v_+|]] \quad (1\text{-}3)$$

$$R_{vv}^{(2)} = Tr[P_v\Lambda_{ti}[M_v[\Lambda_{ti}[|v_+\rangle\langle v_+|]]]] = (Tr[P_v\Lambda_{ti}[|v_+\rangle\langle v_+|]])^2 = (R_{vv}^{(1)})^2 \quad (1\text{-}4)$$

Therefore, $R_{vv}^{(k)} = (R_{vv}^{(1)})^k$ can be obtained. Because the dynamical map corresponding to $g_{ti}(k)$ satisfies $$\Lambda_{ti}^k = \Lambda_{ti}, g_{ti}(k)^{NoSPAM} = \sum_{v=1}^{N}\left(R^k\right)_{\mu,\mu} = Tr[R^k] = \sum_{i=1}^{N}\lambda_j^k$$

can be obtained, and further the functional correspondence of the dynamical map eigenspectrum based on the quantum noise process between the first quantum output states and the quantum initial states can be obtained. For example, a functional correspondence of the dynamical map eigenspectrum based on the quantum noise process between the first quantum output states and information used for preparing the quantum initial states (i.e., $A_j$) can be obtained, which may be expressed as formula 1-5 below:

$$g_{ti}(k) = Tr\left[(R_{meas}R)^k R_{prep}\right] = Tr\left[A_{prep}D^k\right] = \sum_{i=1}^{N} A_j(m_j\lambda_j)^k \quad (1\text{-}5)$$

where $R_{meas}$ is a sub-matrix of a Pauli transition matrix of $N_{meas}$, $R_{prep}$ is a sub-matrix of a Pauli transition matrix of $N_{prep}$, a diagonalizable $R_{meas}R = VDV^{-1}$, and a preparation error of the quantum initial state is $A_{prep}=V^{-1}R_{prep}V$. Because a plurality of first quantum output states $g_{ti}(k)$ have been known through the above step 102, and $A_j$ can be obtained according to the Pauli matrix used in the preparation process of the above step 101, the dynamical map eigenspectrum $Eig^{(a)}=\{m_1\lambda_1, m_2\lambda_2, m_3\lambda_3 \ldots\}$ including the first error is further obtained through analysis using the matrix pencil method based on the above formula 1-5, where $m_j$ represents the first error, which is mainly the measurement error of the projection test gate.

Similarly, in the case shown in FIG. 3b, the second quantum output states obtained after the quantum initial states pass through the second circuits may be expressed as formula 1-6 below, and the functional correspondence of the dynamical map eigenspectrum based on the quantum noise process between the second quantum output states and the quantum initial states can be obtained, for example, a functional correspondence of the dynamical map eigenspectrum based on the quantum noise process between the second quantum output states and information used for preparing the quantum initial states (i.e., $A_j$), may be expressed as formula 1-7 below:

$$g_{ti}(k) = \frac{1}{2}\sum_{v=1}^{N} Tr\left[P_v(N_{meas} \circ M_v \circ M_v \circ \Lambda)^k \circ N_{prep}(P_v)\right] \quad (1\text{-}6)$$

$$g_{ti}(k) = Tr\left[(R_{meas}R_{meas}R)^k R_{prep}\right] = Tr\left[A_{prep}D^k\right] = \sum_{j=1}^{N} A_j(m_j^2\lambda_j)^k \quad (1\text{-}7)$$

where a diagonalizable $R_{meas}R_{meas}R=VDV^{-1}$, and a preparation error of the quantum initial state is $A_{prep}=V^{-1}R_{prep}V$. Because a plurality of second quantum output states $g_{ti}(k)$ have been known through the above step 104, and $A_j$ can be obtained according to the Pauli matrix used in the preparation process of the above step 101, the dynamical map eigenspectrum $Eig^{(b)}=\{m_1^2\lambda_1, m_2^2\lambda_2, m_3^2\lambda_3 \ldots\}$ including the second error is further obtained through analysis using the matrix pencil method based on the above formula 1-7, where $m_j^2$ represents the second error, which is mainly used for representing the measurement error of two projection test gates (i.e., dual projection test gate).

In this way, based on the dynamical map eigenspectrum including the first error and the dynamical map eigenspectrum including the second error obtained above, a dynamical map eigenspectrum free of errors (including the quantum initial state preparation error and the measurement error), i.e., a dynamical map eigenspectrum having no coefficient, can be obtained, which may specifically be expressed as formula 1-8 below:

$$\lambda_i = \frac{(Eig_i^{(a)})^2}{Eig_i^{(b)}} = \frac{(m_i\lambda_i)^2}{m_i^2\lambda_i} \quad (1\text{-}8)$$

The above method is only for obtaining a dynamical map eigenspectrum at a certain evolutionary moment. By analogy, the error-free dynamical map eigenspectrum $\Lambda_i \rightarrow \{\lambda_1^{(i)}, \lambda_2^{(i)}, \lambda_3^{(i)}, \ldots\}$, $i=1, 2 \ldots, N$ of the quantum noise process at any evolutionary moment ti can be obtained in the non-Markovian quantum noise process.

In the above-mentioned non-Markovian quantum noise process, it is possible to construct quantum output states outputted from the circuits at different evolutionary moments, for example, construct a plurality of sets of signal functions, and each set of signal functions corresponds to one evolutionary moment, including $\{g_{ti}(1), g_{ti}(2), \ldots, g_{ti}(K)\}$, so that the dynamical map corresponding to $g_{ti}(k)$ satisfies $\Lambda_{ti}^k = \Lambda_{ti}$, and then the plurality of sets of signal functions are analyzed by the matrix pencil method to obtain a plurality of sets of dynamical map characteristic spectra $\{\lambda_1^{(1)}, \lambda_2^{(1)}, \lambda_3^{(1)}, \ldots\}, \{\lambda_1^{(2)}, \lambda_2^{(2)}, \lambda_3^{(2)}, \ldots\}, \ldots, \{\lambda_1^{(N)}, \lambda_2^{(N)}, \lambda_3^{(N)}, \ldots\}$, while avoiding errors. The specific process is shown in Table 1 below:

TABLE 1

| $g_{t1}(1)$ | $g_{t2}(1)$ | ... | $g_{tN}(1)$ |
| $g_{t1}(2)$ | $g_{t2}(2)$ | ... | $g_{tN}(2)$ |
| $g_{t1}(3)$ | $g_{t2}(3)$ | ... | $g_{tN}(3)$ |
| $g_{t1}(K)$ | $g_{t2}(K)$ | ... | $g_{tN}(K)$ |
| $\Lambda_1 \rightarrow$ | $\Lambda_2 \rightarrow$ | ... | $\Lambda_N \rightarrow$ |
| $\{\lambda_1^{(1)}, \lambda_2^{(1)}, \lambda_3^{(1)}.\}$ | $\{\lambda_1^{(2)}, \lambda_2^{(2)}, \lambda_3^{(2)}.\}$ | ... | $\{\lambda_1^{(N)}, \lambda_2^{(N)}, \lambda_3^{(N)}.\}$ |

In various embodiments, the K in the Table 1 may refer to a number of circuits in the plurality of first circuits, and/or a number of circuits in the plurality of second circuits. In some implementations, a number of circuits in the plurality of first circuits is the same as a number of circuits in the plurality of second circuits.

It can be seen that, in the method of this embodiment, when analyzing the non-Markovian quantum noise process, the quantum noise process analysis system respectively inputs the prepared quantum initial states into a plurality of first circuits and a plurality of second circuits to obtain a plurality of first quantum output states and a plurality of second quantum output states, and then determines a dynamical map eigenspectrum including the first error and a dynamical map eigenspectrum including the second error. Because the numbers of projection test gates included in the first circuit and the second circuit are different, errors caused in the analysis of the quantum initial state in the evolution process are also different (that is, the first error and the second error are different). Therefore, an error-eliminated dynamical map eigenspectrum may be obtained according to the dynamical map eigenspectrum including the first error and the dynamical map eigenspectrum including the second error, so that the quantum noise process can be analyzed more accurately according to the error-eliminated dynamical map eigenspectrum, and noise in the quantum system can be monitored more accurately, thereby achieving accurate and targeted regulation of the quantum system.

In some embodiments, the analysis of the quantum noise process by the quantum noise process analysis system based on the above-determined error-eliminated dynamical map eigenspectrum may include, but is not limited to, the following methods of analysis:

(1) Determine an Eigenspectrum of a Transfer Tensor Map According to the Dynamical Map Eigenspectrum of the Quantum Noise Process.

For example, the quantum noise process analysis system determines the eigenspectrum of the transfer tensor map according to the dynamical map eigenspectrum of the quantum noise process obtained above and a preset first correspondence. The transfer tensor map is used for characterizing a dynamical evolution of a quantum noise process of a memory kernel based on a quantum system, and is mainly a set of maps extracted from the above-mentioned dynamical maps. This set of maps encodes the memory kernel of the quantum system, and is used for predicting the dynamical evolution of the quantum system.

For example, for the dynamical evolution process of the quantum system under non-Markovian quantum noise, a temporally non-localized memory effect of the current quantum system state relative to the previous quantum system state can be introduced, which is expressed using a Nakajima-Zwanzig equation in formula 2-1 below:

$$\dot{\rho}_t = \int_0^t \mathcal{K}_{t-t'} \rho_{t'} dt' \quad (2\text{-}1)$$

where $\mathcal{K}_t$ is a memory kernel used for characterizing a relationship between a current state and a previous state of the quantum system and satisfies $$\mathcal{K}_t = \sum_{\alpha=1}^3 k_\alpha(t) \mathcal{L}_\alpha.$$

If the noise channel is a Pauli channel (Pauli noise channel), $\mathcal{K}_t[U_\alpha] = \varkappa_\alpha(t) U_\alpha$ can be obtained, where $$\aleph_\alpha(t) = k_\alpha(t) - \sum_{\beta=1}^3 k_\beta(t) \cdot \frac{\partial \lambda_\alpha(t)}{\partial t} = \int_0^t \aleph_\alpha(t-t') \lambda_\alpha(t') dt'$$

can be obtained based on the dynamical map eigenspectrum $\lambda_\alpha(t)$ of quantum noise determined in the above embodiment, where $\varkappa_\alpha(t)$ is the eigenspectrum of the memory kernel.

Because the evolutionary moment interval is $t_n = n\delta t$ and the obtained dynamical map of quantum noise is $\Lambda_n \equiv \Lambda(t_n)$, the current state $(t_n)$ of the quantum system may also be linked to a previous state sequence $(t < t_n)$ using a transfer tensor map T. In the case of a time translation-invariant quantum system $$\rho(t_n) = \sum_{m=0}^{n-1} T_{n-m} \rho(t_m),$$

the above Nakajima-Zwanzig equation in formula 2-1 may be updated to a form of discrete time points in formula 2-2 below:

$$\dot{\rho}(t_n) = \sum_{m=0}^{n-1} \mathcal{K}_{n-m} \rho(t_m) \delta t \quad (2\text{-}2)$$

Based on the above formulas 2-1 and 2-2, the transfer tensor map $T_n = \mathcal{K}_n \delta t^2 + \delta_{n,1} \mathbb{I}$ can be obtained. Since the Pauli channel satisfies $\mathcal{K}_n[U_\alpha] = \varkappa_\alpha(t) U_\alpha$, $T_n[U_\alpha] = \tau_n^\alpha U_\alpha$ can be obtained, where a unitary operator $U_\alpha$ is a Pauli matrix, $\tau_n^\alpha$ is the eigenspectrum of the transfer tensor map, and the eigenspectrum of the transfer tensor map and the eigenspectrum of the memory kernel satisfy a second correspondence: $\tau_n^\alpha = \varkappa^\alpha(t_n) \delta t^2 + \delta_{n,1}$. Since the dynamical map of the quantum noise process also satisfies $$\Lambda(t_n) = \sum_{m=0}^{n-1} T_{n-m} \Lambda(t_m),$$

the dynamical map is diagonalized based on $$\Lambda(t_n)[U_\alpha] = \sum_{m=0}^{n-1} T_{n-m} \Lambda(t_m)[U_\alpha],$$

and a first correspondence between the dynamical map eigenspectrum and the eigenspectrum of the transfer tensor map in formula 2-3 below is obtained. The first correspondence may be preset in the quantum noise process analysis system in advance:

$$\lambda_n^\alpha = \sum_{m=0}^{n-1} \tau_{n-m}^\alpha \lambda_m^\alpha \quad (2\text{-}3)$$

where the dynamical map spectrum $\lambda_\alpha(t_n)$ is abbreviated as $\lambda_n^\alpha$. The first correspondence may also be given by combining $$\frac{\partial \lambda_\alpha(t)}{\partial t} = \int_0^t \aleph_\alpha(t-t') \lambda_\alpha(t') dt' \lambda_\alpha'(t)$$

obtained above. Further, based on the above formula 2-3, the following formula 2-4 for predicting the dynamical evolution can be obtained:

$$\tau_n^\alpha = \lambda_n^\alpha - \sum_{m=1}^{n-1} \tau_{n-m}^\alpha \lambda_m^\alpha \quad (2\text{-}4)$$

That is to say, the current state of the quantum system is usually only affected by a finite number (which is, for example, Y) of previous states, that is, $$\lambda_n^\alpha = \sum_{m=n-K}^{n-1} \tau_{n-m}^\alpha \lambda_m^\alpha.$$

Therefore, as long as dynamical map eigenspectra at evolutionary moments 0 to $t_n$ are obtained, dynamical map eigenspectra at subsequent evolutionary moments can be predicted based on the eigenspectrum of the transfer tensor map.

In some embodiments, the dynamical map eigenspectrum of the quantum noise process obtained by the quantum noise process analysis system in the above steps includes: dynamical map eigenspectra of the quantum noise process at a plurality of evolutionary moments in a period of time. In this case, dynamical map eigenspectra of the quantum noise process at evolutionary moments after the period of time may further be predicted according to the dynamical map eigenspectra of the quantum noise process at the plurality of evolutionary moments in the period of time, the eigenspectrum of the transfer tensor map, and the preset first correspondence.

(2) Determine a Correlation Function of the Quantum Noise Process.

For example, the quantum noise process analysis system determines an eigenspectrum of a memory kernel of the quantum noise process according to the eigenspectrum of the transfer tensor map of the quantum noise process and a preset second correspondence, where the memory kernel is used for characterizing a relationship between a current state and a previous state of the quantum system; and then determines a correlation function of the quantum noise process according to the eigenspectrum of the memory kernel of the quantum noise process and a preset third correspondence, and determines a spectrum of the quantum noise process according to the correlation function. For example, the spectrum of the quantum noise process may be obtained by performing a Fourier transform on the correlation function.

For Gaussian steady noise, the correlation function of the quantum noise process determines the nature of the noise. The correlation function is used for characterizing the quantum noise process. Therefore, it is important to extract the correlation function and spectrum from the experiment. In some embodiments, an interaction Hamiltonian $H_{sb}(t)=\Sigma_{i,\alpha}B_i^{\alpha}(t)\sigma_i^{\alpha}$ between the quantum system and the bath is considered, where $\sigma_i^{\alpha}$ is a Pauli operator corresponding to bit i, and $B_i^{\alpha}(t)$ is a noise bath operator, which, considering Gaussian noise, is described by two quantities $<B_1^{\alpha}(t)>$ and $<B_i^{\alpha}(t)B_j^{\alpha'}(t')>$.

In the open system theory, the exact expression of the memory kernel of dynamical evolution may be expressed as formula 3-1 below:

$$\mathcal{K}(t,t') = \mathcal{PL}(t)\exp_+\left[\int_{t'}^{t}ds Q\mathcal{L}(s)\right]Q\mathcal{L}(t')\mathcal{P} \quad (3\text{-}1)$$

In ordinary quantum hardware, quantum noise has been initially controlled in engineering, so the coupling strength between quantum devices and the bath is relatively weak. In this case, a second-order perturbation approximation can be used to process the memory kernel. Taking a single qubit as an example, the approximation may be performed using formula 3-2 below:

$$\mathcal{K}_2(t)\rho(t) \approx <(\mathcal{L}_{sb}(t)\mathcal{L}_{sb}(0)>\rho(t)=\Sigma_{\alpha\alpha'}[\sigma^{\alpha}, C_{\alpha\alpha'}(t)\sigma^{\alpha'}(t)\rho(t)-C^*_{\alpha\alpha'}(t)\rho(t)\sigma^{\alpha'}(t)] \quad (3\text{-}2)$$

where a Liouville operator $\mathcal{L}_{sb}\rho(t)=-i[H_{sb}(t),\rho(t)]$, so the correlation function of quantum noise may be expressed as $C_{\alpha\alpha'}(t)=<B^{\alpha}(t)B^{\alpha'}(0)>$. Therefore, it can be proved that for the Pauli noise channel, the correlation function may be expressed by formula 3-3 below:

$$\mathcal{K}_2(t)\rho(t) = \sum_{\alpha=1}^{3}[C_{\alpha\alpha}(t)+C^*_{\alpha\alpha}(t)]*[\sigma_{\alpha}\rho(t)\sigma_{\alpha}-\rho(t)] \quad (3\text{-}3)$$

$$\mathcal{K}_t = \sum_{\alpha=1}^{3}\frac{1}{2}k_{\alpha}(t)[\mathbb{U}_{\alpha}-\mathbb{1}]$$

can be obtained from the above process of determining the eigenspectrum of the transfer tensor map. Therefore, $k_{\alpha}(t)=2[C_{\alpha\alpha}(t)+C^*_{\alpha\alpha}(t)]$ can be obtained. Because $$\aleph_{\alpha}(t_n) = k_{\alpha}(t_n) - \sum_{\beta=1}^{3}k_{\beta}(t_n),$$

a third correspondence between the eigenspectrum of the memory kernel and the correlation function of the quantum noise process shown in formula 3-4 below can be obtained. The third correspondence may be preset in the quantum noise process analysis system in advance:

$$\aleph_{\alpha}(t_n) = 2[C_{\alpha\alpha}(t_n)+C^*_{\alpha\alpha}(t_n)] - \sum_{\beta=1}^{3}2[C_{\beta\beta}(t_n)+C^*_{\beta\beta}(t_n)] \quad (3\text{-}4)$$

$\tau_n^{\alpha}=\varkappa_{\alpha}(t_n)\delta t^2+\delta_{n,1}$, i.e., a second correspondence between the eigenspectrum $\tau_n^{\alpha}$ of the transfer tensor map of the quantum noise process and the eigenspectrum $\varkappa_{\alpha}(t_n)$ of the memory kernel, can be obtained in the above process of determining the eigenspectrum of the transfer tensor map, and the second correspondence may be preset in the quantum noise process analysis system in advance. Therefore, as long as the dynamical map eigenspectrum is obtained, the eigenspectrum of the transfer tensor map can be obtained according to the above first correspondence, the eigenspectrum of the memory kernel can be obtained according to the eigenspectrum of the transfer tensor map and the second correspondence, the correlation function of quantum noise can be derived according to the eigenspectrum of the memory kernel and the third correspondence, and the correlation function can be Fourier transformed to obtain the spectrum of quantum noise, which may be expressed by formula 3-5 below:

$$J_{\alpha\alpha'}(\omega) = \frac{1}{2}\int_{-\infty}^{\infty}dt e^{i\omega t}[C_{\alpha\alpha'}(t)-C^*_{\alpha\alpha'}(t)] \quad (3\text{-}5)$$

(3) Analyze the Non-Markovian Characteristics of the Quantum Noise Process

For example, the quantum noise process analysis system constructs a non-Markovian noise model of the quantum noise process according to the dynamical map eigenspectrum of the quantum noise process, where the non-Markovian noise model is a model based on a decoherence rate of the quantum noise process. For example, the non-Markovian noise model is constructed according to a correspondence between the dynamical map eigenspectrum and the decoherence rate of the quantum noise process. Then, a non-Markovian noise intensity of the quantum noise process is determined based on the non-Markovian noise model of the quantum noise process.

In an implementation, taking a single-qubit quantum initial state as an example, if the quantum noise is a Pauli channel, then the dynamical map of the quantum system $$\Lambda_t = f_0(t)\mathbb{1} + \sum_{\alpha=1}^{3}f_{\alpha}(t)\mathbb{U}_{\alpha},$$

where $\mathbb{U}^{\alpha}[\rho]=U_{\alpha}\rho U_{\alpha}^{\dagger}$, and a unitary operator $U_{\alpha}=\sigma_{\alpha}$ is a Pauli matrix. It can be proved that $\Lambda_t[U_{\alpha}]=\lambda_{\alpha}(t)U_{\alpha}$, where the dynamical map eigenspectrum spectrum $\lambda_{\alpha}(t)=2(f_0(t)+f_{\alpha}(t))-1$.

According to a motion equation $\dot{\rho}_t=\mathcal{L}_t[\rho_t]$ of the interaction between the quantum system and the bath noise, it can be derived that the dynamical map satisfies $\dot{\Lambda}_t=\mathcal{L}_t\Lambda_t$, where $$\mathcal{L}_t = \sum_{\alpha=1}^{3}\gamma_{\alpha}(t)\mathcal{L}_{\alpha}, L_{\alpha} = \frac{1}{2}[\mathbb{U}_{\alpha}-\mathbb{1}],$$

and $\gamma_{\alpha}(t')$ is the decoherence rate. If $\gamma_{\alpha}(t)<0$ at some evolutionary moments, the bath noise has non-Markovian characteristics.

The above-mentioned generator $\mathcal{L}_t$ satisfies $\mathcal{L}_t[U_{\alpha}]=\mu_{\alpha}(t)U_{\alpha}$, where $$\mu_{\alpha}(t) = \gamma_{\alpha}(t) - \sum_{\beta=1}^{3}\gamma_{\beta}(t).$$

Therefore, $\dot{\Lambda}_t[U_\alpha] = \mathcal{L}_t \Lambda_t[U_\alpha] \Rightarrow \dot{\lambda}^\alpha(t) = \lambda_\alpha(t)\mu_\alpha(t)$ can be obtained, and then the correspondence between the dynamical map eigenspectrum and the decoherence rate is obtained:

$$\lambda_\alpha(t) = \mathrm{Exp}\left[\int_0^\tau \mu_\alpha(\tau)d\tau\right].$$

The correspondence may be preset in the quantum noise process analysis system in advance. Further, the non-Markovian noise model of the quantum noise process as shown in formula 4-1 below can be constructed according to the dynamical map eigenspectrum:

$$\Gamma_\alpha(t) = \int_0^\tau \gamma_\alpha(\tau)d\tau = \frac{1}{2}\ln\frac{\lambda_\alpha(t)}{\lambda_\beta(t)\lambda_\eta(t)}, \alpha \neq \beta \neq \eta \quad (4\text{-}1)$$

Based on the non-Markovian noise model in the above formula 4-1 and a Rivas-Huelga-Plenio (RHP) measurement formula shown in formula 4-2 below, an RHP measurement result $\mathcal{N}_{NM}$ of the quantum system can be obtained, which depicts the intensity of the non-Markovian characteristic of the quantum noise process. Further, based on the second correspondence between the eigenspectrum of the transfer tensor map and the dynamical map eigenspectrum, it only takes a finite time length to predict the future dynamical map eigenspectrum in the quantum system, thereby calculating $\mathcal{N}_{NM}$ of the quantum system in the future:

$$\mathcal{N}_{NM} = \int_{\gamma_\alpha(\tau)<0}^{\infty} 0 \, \gamma_\alpha(\tau)d\tau \quad (4\text{-}2)$$

The above-mentioned RHP measurement refers to measuring the distinguishability of two optimal initial states evolving through the same quantum system, searching for non-monotonicity in the process, and thus characterizing the non-Markovian intensity of the quantum system.

Through the above analysis of the quantum noise process, the correlation function of the quantum noise process can be known, thereby providing the corresponding noise spectrum. In this way, more targeted and effective regulation of quantum hardware in the quantum system can be achieved. For example, a basis is provided for dynamical decoupling, and the corresponding pulse type and wave-shaped flip time point are set for the noise spectrum of the quantum hardware, thereby suppressing decoherence. Dynamical decoupling is an effective way to suppress decoherence. It is mainly used to effectively suppress the mutual coupling between the qubit and the bath by applying constantly flipped pulses at specific time points (at a certain frequency), thereby suppressing decoherence.

Further, in the above-mentioned analysis of the quantum noise process, the determining of the eigenspectrum of the transfer tensor map, the eigenspectrum of the memory kernel and the spectrum of the quantum noise process are mainly applicable to cases where the above-mentioned noise evolution gate is a Pauli noise channel. For cases where the above-mentioned noise evolution gate is a non-Pauli noise channel, it is necessary to introduce the Pauli rotation approximation method and approximate the non-Pauli noise channel to a Pauli noise channel, to adapt to the above analysis process. For example, before performing the above step 103, the quantum noise process analysis system first approximates a dynamical map of the quantum noise process by Pauli rotation, to retain a Pauli noise channel in quantum noise channels. In this way, when the above step 103 is performed, the dynamical map eigenspectrum including the first error may be determined according to a functional correspondence of a dynamical map eigenspectrum based on the retained Pauli noise channel between the plurality of first quantum output states and the quantum initial states. When performing the above step 105, the quantum noise process analysis system may determine the dynamical map eigenspectrum including the second error according to a functional correspondence of the dynamical map eigenspectrum based on the retained Pauli noise channel between the plurality of second quantum output states and the quantum initial states.

In an implementation, when performing Pauli rotation approximation:

taking a single qubit as an example, the dynamical map A of any quantum noise channel can be approximated by the Pauli rotation of formula 5-1 below:

$$\tilde{\Lambda}(\rho) = \frac{1}{4}\sum_{\mu=0}^{3} P_\mu \Lambda[P_\mu \rho P_\mu] P_\mu \quad (5\text{-}1)$$

where the Pauli operators $P_\mu \in \{I, \sigma_x, \sigma_y, \sigma_z\}$. Only the Pauli noise channel is left after the Pauli rotation approximation. After the initial quantum states pass through the Pauli noise channel approximated by Pauli rotation, the quantum output states that can be obtained may be expressed by formula 5-2 below:

$$g(k) = \frac{1}{8}\sum_{\nu=1}^{3}\sum_{\mu=0}^{3} Tr[P_\nu N_{meas} \circ [P_\mu \Lambda^k \circ N_{prep}[P_\mu P_\nu P_\mu]P_\mu]] \quad (5\text{-}2)$$

If the dynamical map of any quantum noise process satisfies $$\Lambda[\rho] = \sum_{\mu,\mu'=0}^{3} f_{\mu\mu'} P_\mu \rho P_{\mu'},$$

it can be proved that the Pauli transition matrix R satisfies $R_{\nu\nu'}$ $Tr[P_\nu \Lambda[P_{\nu'}]] = f_{\nu\nu'} + f_{\nu'\nu} + (2f_{00}-1)\delta_{\nu\nu'} + if_{\mu 0} \in_{\nu'\mu\nu} + if_{0\mu} \in_{\nu\mu\nu'}$. Because only the Pauli noise channel of $f_{\mu\mu'}\delta_{\mu\mu'}$ is left after the Pauli rotation approximation, the Pauli transition matrix corresponding to the Pauli noise channel is a diagonal matrix $R_{\nu\nu} = 2f_{\nu\nu} + 2f_{00} - 1$. Then the dynamical map eigenspectrum based on the retained Pauli noise channel is obtained.

Further, the introduction of Pauli rotation approximation to deal with the non-Pauli quantum noise process leads to information loss. In order to restore the information of the quantum system as much as possible, in this embodiment, an optimal Pauli matrix may be selected to prepare the quantum initial states in the process of performing the above step 101 by the quantum noise process system. In this way, the information of the quantum system can be restored as much as possible, and a more accurate non-Markovian noise intensity can be determined. For example, in the process of selecting the optimal Pauli matrix, the above-mentioned quantum noise process analysis is performed cyclically for a plurality of candidate Pauli matrices, so as to select an optimal candidate Pauli matrix from the plurality of candidate Pauli matrices. An example process is as follows:

When performing the above step 101, the quantum noise process analysis system determines a plurality of candidate Pauli matrices, and respectively prepares a plurality of sets of candidate quantum initial states by using the plurality of candidate Pauli matrices, where each candidate Pauli matrix corresponds to one set of candidate quantum initial states. Then, after performing processing similar to the above-mentioned steps 102 to 106 for a plurality of sets of candidate quantum initial states, a plurality of error-eliminated dynamical map eigenspectra are obtained. Further, in the analysis of the quantum noise process, a plurality of non-Markovian noise intensities are determined based on the plurality of sets of candidate quantum initial states, where each set of candidate quantum initial states corresponds to one non-Markovian noise intensity. Then, the quantum noise process analysis system selects the candidate Pauli matrix corresponding to the maximum non-Markovian noise intensity in the plurality of non-Markovian noise intensities, and analyzes the quantum noise process according to the selected candidate Pauli matrix, i.e., prepares a set of quantum initial states.

In an implementation, it may be defined for a single-qubit quantum system that any 2-dimensional unitary matrix can be expressed as formula 6-1 below:

$$U(\theta_1, \theta_2, \theta_3) = \mathcal{R}_{\hat{z}}(\theta_1)\mathcal{R}_{\hat{y}}(\theta_2)\mathcal{R}_{\hat{z}}(\theta_3) \tag{6-1}$$

where $R_{\hat{n}}(\theta)$ is a Pauli transition matrix that rotates along $\hat{n}$ axis by an angle of $\theta$. Then, a new candidate Pauli matrix (hereinafter referred to as new Pauli basis) $P'_\nu \in \{I, UP_xU^\dagger, UP_yU^\dagger UP_zU^\dagger\}$ is selected, and after the Pauli rotation approximation is performed under the new Pauli basis, only the Pauli noise channel part remains. After the initial quantum states pass through the Pauli noise channel approximated by Pauli rotation, the quantum output states that can be obtained may be expressed as formula 6-2 below:

$$g'(k) = \frac{1}{8}\sum_{\nu=1}^{3}\sum_{\mu=0}^{3}Tr[P'_\nu N_{meas} \circ [P'_\mu \Lambda^k \circ N_{prep}[P'_\mu P'_\nu P'_\mu]P'_\mu]] \tag{6-2}$$

Further, an error-eliminated dynamical map eigenspectrum is determined: $\lambda'_\alpha(t)$, which further proves that the dynamical map of the quantum noise process is $$\tilde{\Lambda}_t = f'_0(t)\mathbb{I} + \sum_{\alpha=1}^{3} f'_\alpha(t)\mathbb{U}'_\alpha$$

after Pauli rotation is performed under the new Pauli basis. where $\mathbb{U}_\alpha[\rho] = U'_\alpha \rho U'^\dagger_\alpha$, and the unitary operator $U'_\alpha = P'_\alpha$ is a Pauli matrix. It can be proved that the new dynamical map and the memory kernel can be diagonalized according to formulas 6-3 and 6-4 below under the new Pauli basis, so as to obtain a first correspondence between the dynamical map eigenspectrum and the eigenspectrum of the transfer tensor map in formula 6-5 below:

$$\tilde{\Lambda}_t[U'_\alpha] = \lambda'_\alpha(t)U'_\alpha \tag{6-3}$$

$$\frac{\partial \lambda'_\alpha(t)}{\partial t} = \int_0^t \aleph'_\alpha(t-t')\lambda'_\alpha(t')dt' \tag{6-4}$$

$$\lambda'^\alpha_n = \alpha \sum_{m=0}^{n-1} \tau'^\alpha_{n-m} \lambda'^\alpha_m \tag{6-5}$$

Then a non-Markovian noise model shown in formula 6-6 below is constructed:

$$\Gamma'_\alpha(t) = \int_0^\tau \gamma'_\alpha(\tau)d\tau = \frac{1}{2}\ln\frac{\lambda'_\alpha(t)}{\lambda'_\beta(t)\lambda'_\eta(t)}, \alpha \neq \beta \neq \eta \tag{6-6}$$

Then an optimal Pauli basis is selected from a plurality of new candidate Pauli bases so that a relationship in formula 6-7 below is satisfied:

$$\max_U \mathcal{N}_{NM}(U) = \int_{\gamma_\alpha(\tau)<0}^{\infty} 0 \; \gamma'_\alpha(\tau)d\tau \tag{6-7}$$

After the optimal Pauli basis is selected, the quantum noise process is further analyzed according to the optimal Pauli basis.

Further, in some embodiments, the analysis method for the Markovian quantum noise process cannot analyze the non-Markovian quantum noise process well. To be specific, in the analysis process using the analysis method for the Markovian quantum noise process, there will be a valid value that exceeds the original Hilbert space dimension of the qubit when the dynamical map eigenspectrum is obtained. The Hilbert space dimension is certain, and is, for example, a. When the number of dynamical map eigenspectra exceeds a, there is a valid value that exceeds the original Hilbert space dimension of the qubit for the dynamical map eigenspectra.

Therefore, when the quantum noise process is not a non-Markovian quantum noise process and a number of dynamical map eigenspectra determined through analysis exceeds a Hilbert space dimension of the originally prepared qubits, it is determined that qubit leakage occurs in the quantum system. Further, the degree of qubit leakage can be determined by formula 7 below:

$$L_{sum}(\in, H_1) = L_{avg}^{1 \to 2}(e, H_1) + L_{avg}^{2 \to 1}(\in, H_2) \tag{7}$$

where L represents the amount of qubit leakage, $H_1$ represents the qubit Hilbert subspace where the quantum initial states are prepared, $H_2$ represents qubit leakage to a higher energy-level Hilbert subspace, and $\in$ represents the TPCP process. $L_{avg}^{1 \to 2}(\in, H_1)$ represents the amount of leakage of qubits from the qubit Hilbert subspace to a higher-level Hilbert subspace during the TPCP process, and $L_{avg}^{2 \to 1}(\in, H_2)$ represents the amount of leakage of qubits from the higher-level Hilbert subspace to the qubit Hilbert subspace.

Therefore, the amount of qubit leakage is a calculated function value of leakage amounts of leakage between qubits in Hilbert subspaces of different levels, where the dimensions of the Hilbert subspaces of different levels are different.

Figure 4:
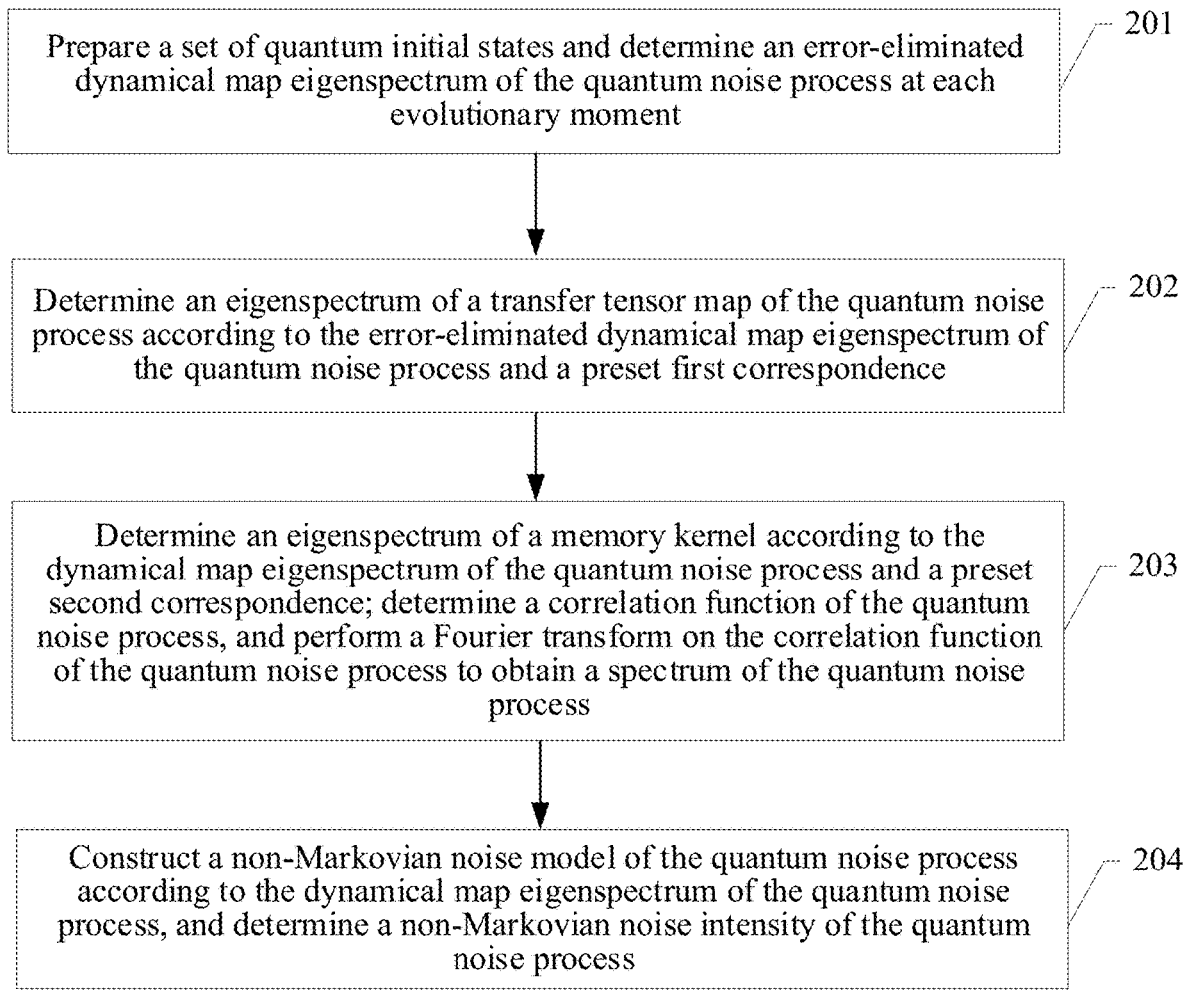
FIG. 4 is a flowchart of a quantum noise process analysis method according to an application embodiment of this application.

The following uses an application example to illustrate the quantum noise process analysis method of this application. As shown in FIG. 4, the quantum noise process analysis system in this embodiment can analyze a non-Markovian quantum noise process according to the following steps:

Step 201: Prepare a set of quantum initial states, input the quantum initial states into a plurality of first circuits and a plurality of second circuits at each evolutionary moment to obtain a plurality of first quantum output states and a plurality of second quantum output states at each evolutionary moment, determine a dynamical map eigenspectrum including a first error according to the plurality of first quantum output states, determine a dynamical map eigenspectrum including a second error according to the plurality of second quantum output states, and determine an error-eliminated dynamical map eigenspectrum of the quantum noise process at each evolutionary moment.

The plurality of first circuits may be as shown in FIG. 3a. Each first circuit includes at least one noise evolution gate and a projection test gate corresponding to each noise evolution gate. The plurality of second circuits may be as shown in FIG. 3b. Each second circuit includes at least one noise evolution gate and a dual projection test gate corresponding to each noise evolution gate.

Step 202: Determine an eigenspectrum of a transfer tensor map of the quantum noise process according to the error-eliminated dynamical map eigenspectrum of the quantum noise process and a preset first correspondence. In some implementations, the preset first correspondence may include, for example, the first correspondence shown in the above formula 2-3. In addition, eigenspectra of the transfer tensor map at future evolutionary moments may also be predicted according to the eigenspectrum of the transfer tensor map at the current evolutionary moment, the error-eliminated dynamical map eigenspectrum, and the first correspondence.

In an actual application process, the quantum noise process in the quantum system adopts a non-Markovian pure de-phasing noise model $B_z(t)$ and a non-Markovian $B_x(t)$ directional noise model, i.e., models of noise evolution gates used in the process of obtaining the dynamical map eigenspectrum. Since the non-Markovian pure de-phasing model and the non-Markovian $B_x(t)$ directional noise model both correspond to a Pauli noise channel, the error-eliminated dynamical map eigenspectrum may be obtained by directly using the analysis method for the non-Markovian quantum noise process in the above steps 201 and 202, and then dynamical map eigenspectra of the quantum noise process and eigenspectra of the transfer tensor map at future evolutionary moments are predicted according to the eigenspectrum of the transfer tensor map in the current state.

Figure 5A:
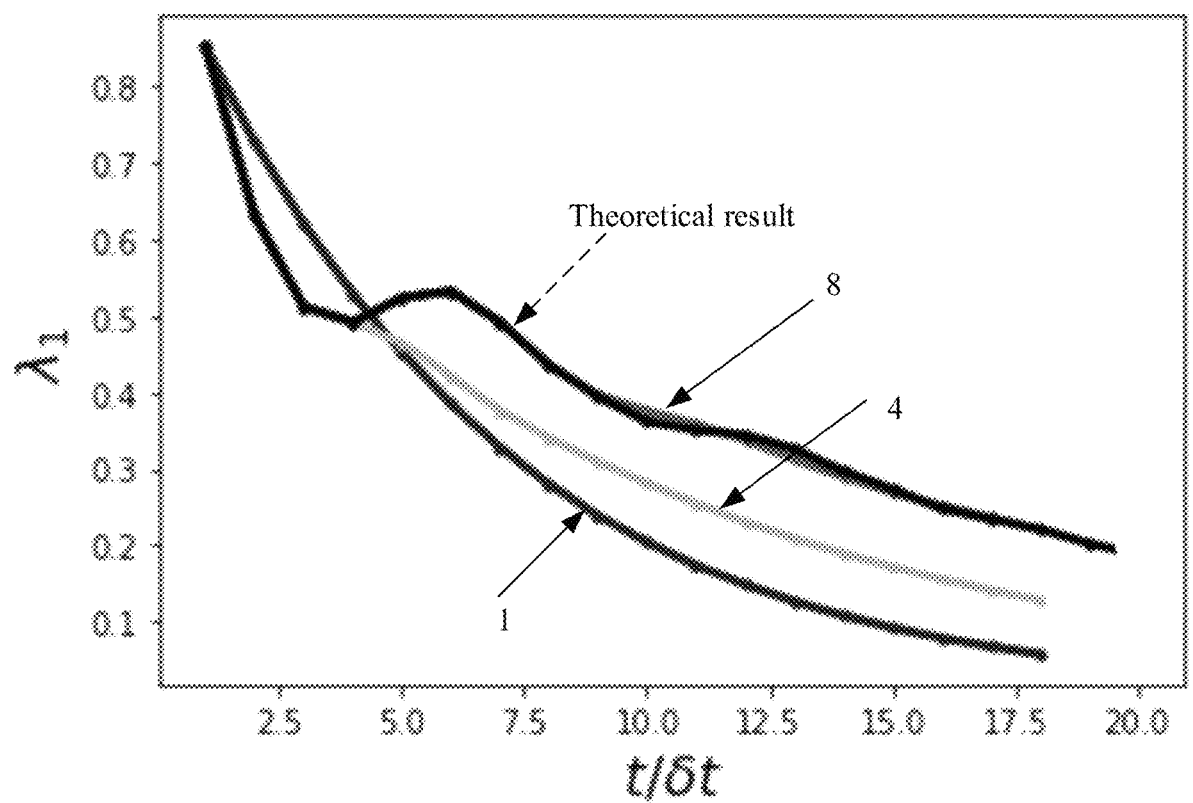
FIG. 5a is a schematic diagram of a prediction result of future evolution changing with time in an application embodiment of this application.
Figure 5B:
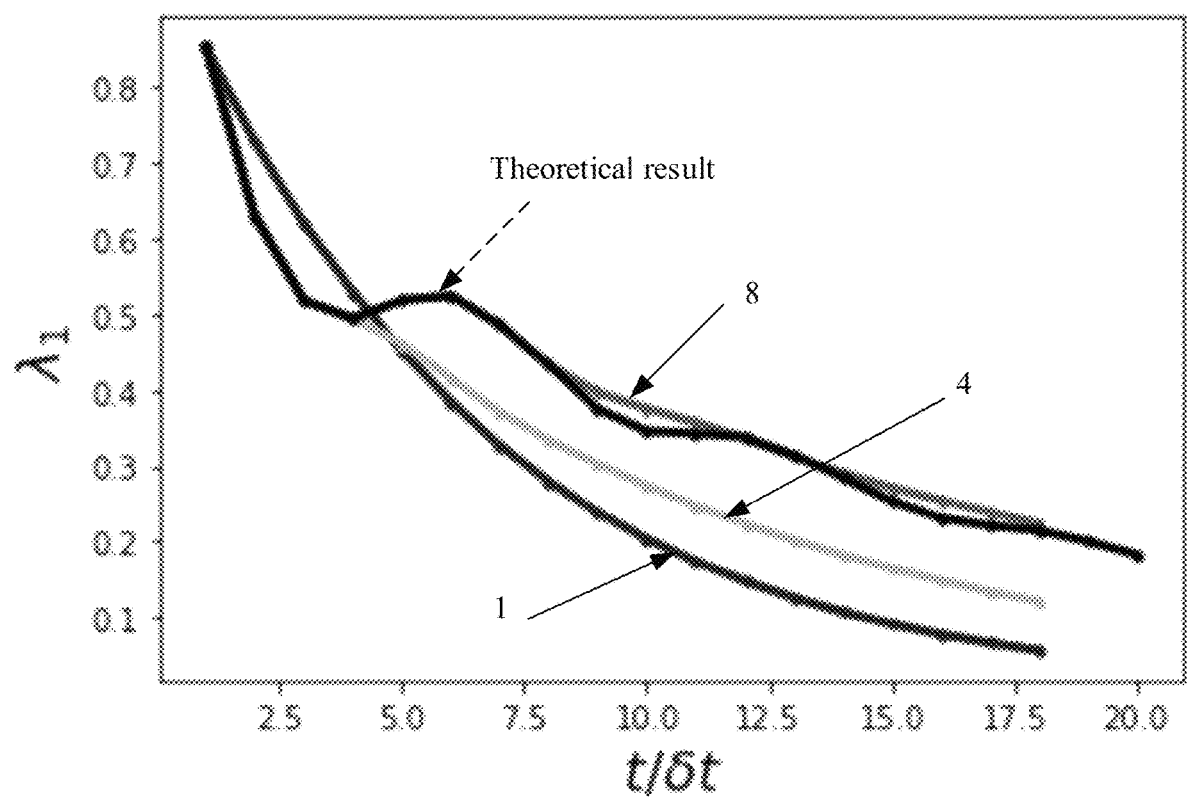
FIG. 5b is a schematic diagram of another prediction result of future evolution changing with time in an application embodiment of this application.

For example, FIG. 5a and FIG. 5b respectively show prediction results of future evolution obtained according to the eigenspectrum of the transfer tensor map and the dynamical map under a non-Markovian pure decoherence model (corresponding to FIG. 5a) and the non-Markovian $B_x(t)$ directional noise model (corresponding to FIG. 5b), where the ordinate is the predicted dynamical map eigenspectrum, the abscissa is the evolutionary moment, a curve indicated by a dashed arrow is a theoretical prediction result, and curves indicated by other solid arrows are prediction results obtained by introducing different numbers (respectively 1, 4, and 8) of valid eigenspectra of the transfer tensor map. It can be seen that a relatively accurate prediction effect is obtained when 8 valid eigenspectra of the transfer tensor map is introduced. It also shows that the quantum noise process is a non-Markovian noise model.

Step 203: Determine an eigenspectrum of a memory kernel according to the dynamical map eigenspectrum of the quantum noise process and a preset second correspondence; then determines a correlation function of the quantum noise process according to the eigenspectrum of the memory kernel and a preset third correspondence, and then perform a Fourier transform on the correlation function of the quantum noise process to obtain a spectrum of the quantum noise process. In some implementations, the preset second correspondence may include a second correspondence expressed as $\tau_n^\alpha = \varkappa_\alpha(t_n)\delta t^2 + \delta_{n,1}$. In some other implementations, the preset third correspondence may include, for example, the above formula 3-4.

In an actual application process, the quantum noise process in the quantum system adopts a non-Markovian pure de-phasing noise model and a non-Markovian $B_x(t)$ directional noise model. Since the non-Markovian pure de-phasing model and the non-Markovian $B_x(t)$ directional noise model both correspond to a Pauli noise channel, the error-eliminated dynamical map eigenspectrum may be obtained by directly using the analysis method for the non-Markovian quantum noise process in the above steps 201 and 202, and then the correlation function of the quantum noise process is determined according to the method in step 203.

Figure 6A:
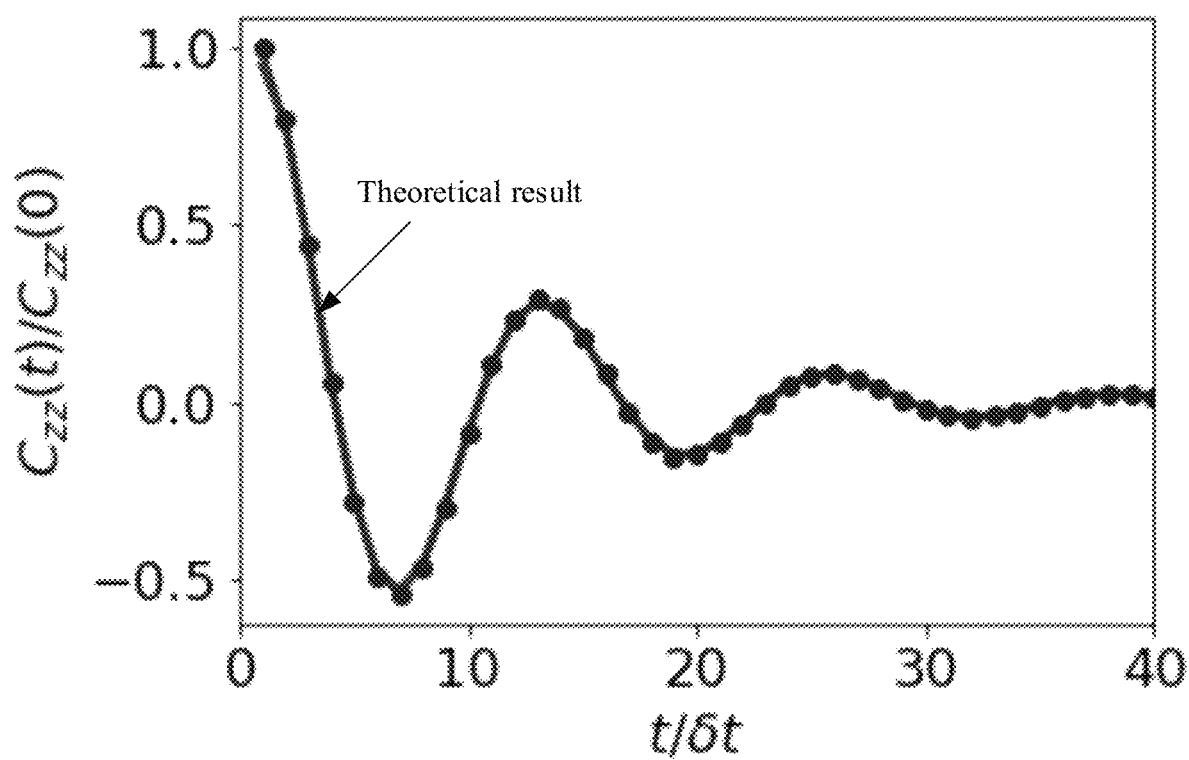
FIG. 6a is a schematic diagram showing correlation function parameter value of a quantum noise process changing with time in an application embodiment of this application.
Figure 6B:
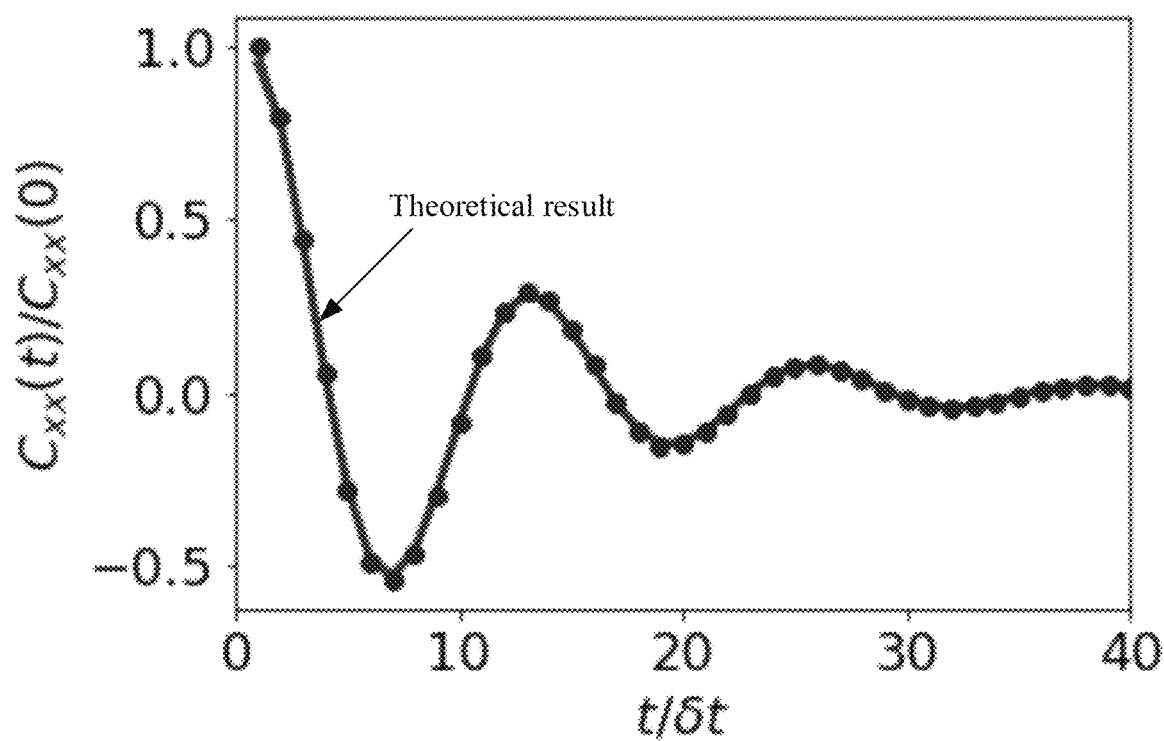
FIG. 6b is a schematic diagram showing correlation function parameter value of another quantum noise process changing with time in an application embodiment of this application.

For example, FIG. 6a and FIG. 6b respectively show correlation functions of the quantum noise process determined under a non-Markovian pure decoherence model (corresponding to FIG. 6a) and a non-Markovian directional $B_x(t)$ noise model (corresponding to FIG. 6b), where the abscissa is the evolutionary moment, the ordinate is a parameter value in the correlation function, a curve indicated by a solid arrow is a theoretical prediction result, and points shown are determined correlation functions. It can be seen that the capture of the correlation function of the quantum noise process can be effectively implemented according to the eigenspectrum of the transfer tensor map.

Step 204: Construct a non-Markovian noise model of the quantum noise process according to the dynamical map eigenspectrum of the quantum noise process, and then determine a non-Markovian noise intensity of the quantum noise process based on the non-Markovian noise model of the quantum noise process.

In an actual application process, the quantum noise process in the quantum system adopts a non-Markovian pure de-phasing noise model and a non-Markovian $B_x(t)$ directional noise model. Since the non-Markovian pure de-phasing model and the non-Markovian $B_x(t)$ directional noise model both correspond to a Pauli noise channel, the error-eliminated dynamical map eigenspectrum may be obtained by directly using the analysis method for the non-Markovian quantum noise process in the above steps 201 and 202, and then the non-Markovian noise intensity of the quantum noise process is determined according to the method in step 204.

Figure 7A:
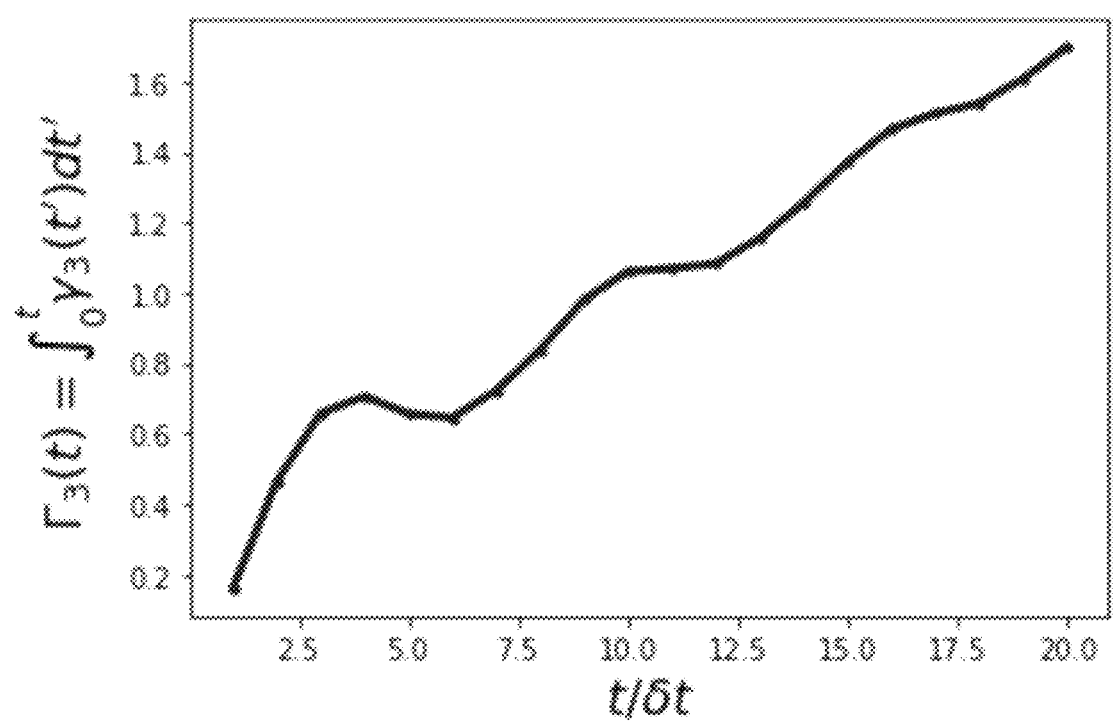
FIG. 7a is a schematic diagram of a non-Markovian noise model of a quantum noise process changing with time in an application embodiment of this application.
Figure 7B:
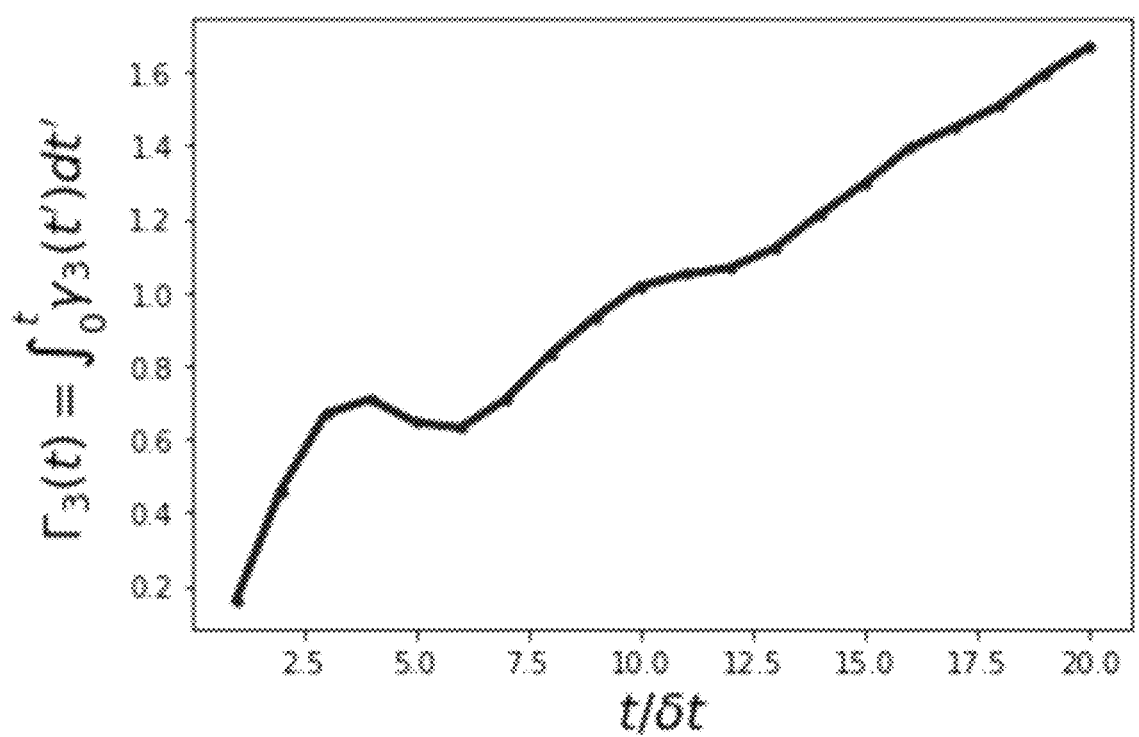
FIG. 7b is a schematic diagram of a non-Markovian noise model of another quantum noise process changing with time in an application embodiment of this application.

For example, FIG. 7a and FIG. 7b respectively show non-Markovian noise models of the non-Markovian quantum noise process under a non-Markovian pure decoherence model (corresponding to FIG. 7a) and a non-Markovian $B_x(t)$ directional noise model (corresponding to FIG. 7b), where the abscissa is the evolutionary moment, the ordinate is the non-Markovian noise model, and the fluctuation of the curve along the time direction has a negative gradient, indicating that the decoherence rate $\gamma_\alpha(t)$ is negative at a certain moment, i.e., a non-Markovian noise channel. The RHP value $N_{NM}$ can also be further accumulated to quantitatively provide the non-Markovian noise intensity.

The method in the above embodiment is for the analysis of the quantum noise process when the quantum noise process belongs to a Pauli channel. In other embodiments, if the quantum noise process belongs to a non-Pauli channel, the quantum noise process analysis method is similar to the analysis method of the above steps 201 to 204, except that:

in the process of performing the above step 201, the dynamical map of the quantum noise process is first approximated by Pauli rotation to retain the Pauli noise channel in the quantum noise channel, so the first quantum output states (or second quantum output states) and the quantum initial states have a functional correspondence based on the dynamical map eigenspectrum of the retained Pauli noise channel. An optimal Pauli basis may be selected to reduce the information loss of the quantum system. For example, a plurality of candidate Pauli bases are selected to prepare a plurality of sets of candidate quantum initial states; a Pauli noise channel obtained by Pauli rotation approximation is used to determine an error-eliminated dynamical map eigenspectrum of evolution of each set of candidate quantum initial states; a non-Markovian noise intensity corresponding to each set of candidate quantum initial states is finally obtained according to a method similar to that in steps 202 to 205; and an optimal Pauli basis is selected from the plurality of candidate Pauli bases according to the non-Markovian noise intensity, so as to analyze the quantum noise process.

In an actual application process, the quantum noise process in the quantum system adopts the non-Markovian $B_x(t)+B_y(t)$ directional noise model, and there is noise correlation in the x+y direction. Since the non-Markovian $B_x(t)+B_y(t)$ directional noise model is not a Pauli noise channel, an optimal Pauli basis is selected, the analysis method for the non-Markovian quantum noise process with Pauli rotation approximation is used to obtain an error-eliminated dynamical map eigenspectrum, so as to determine the non-Markovian noise intensity of the quantum noise process.

Figure 8A:
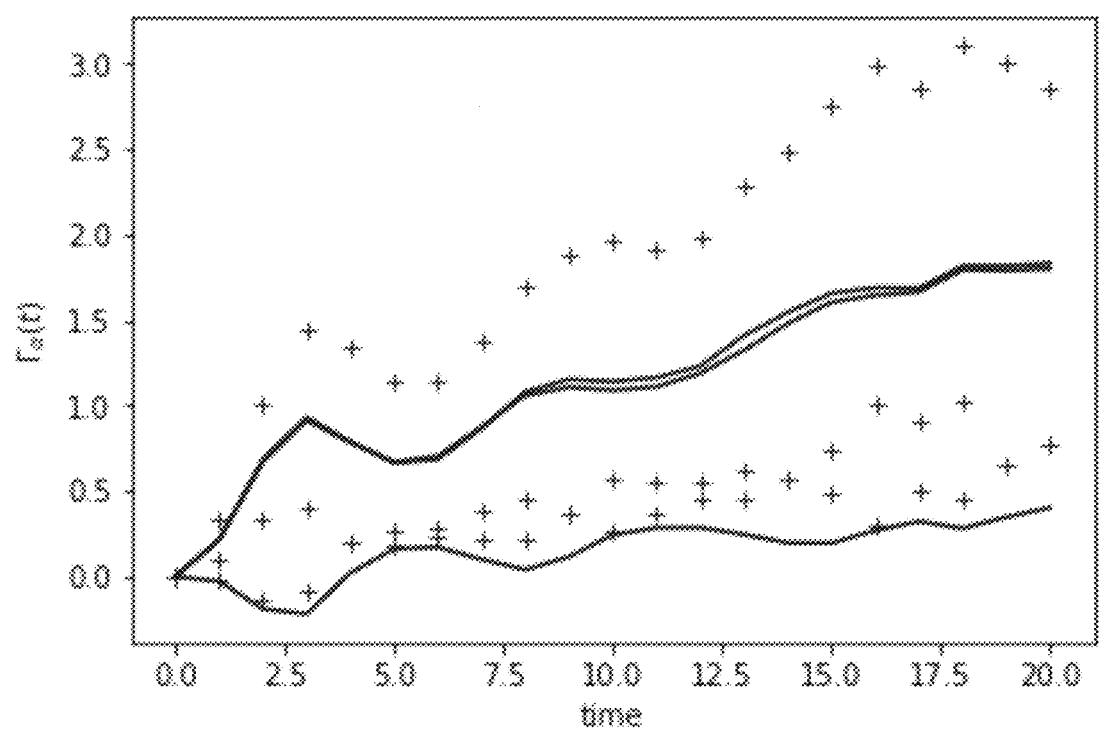
FIG. 8a is a schematic diagram of a non-Markovian noise intensity of a quantum noise process changing with time in an application embodiment of this application.
Figure 8B:
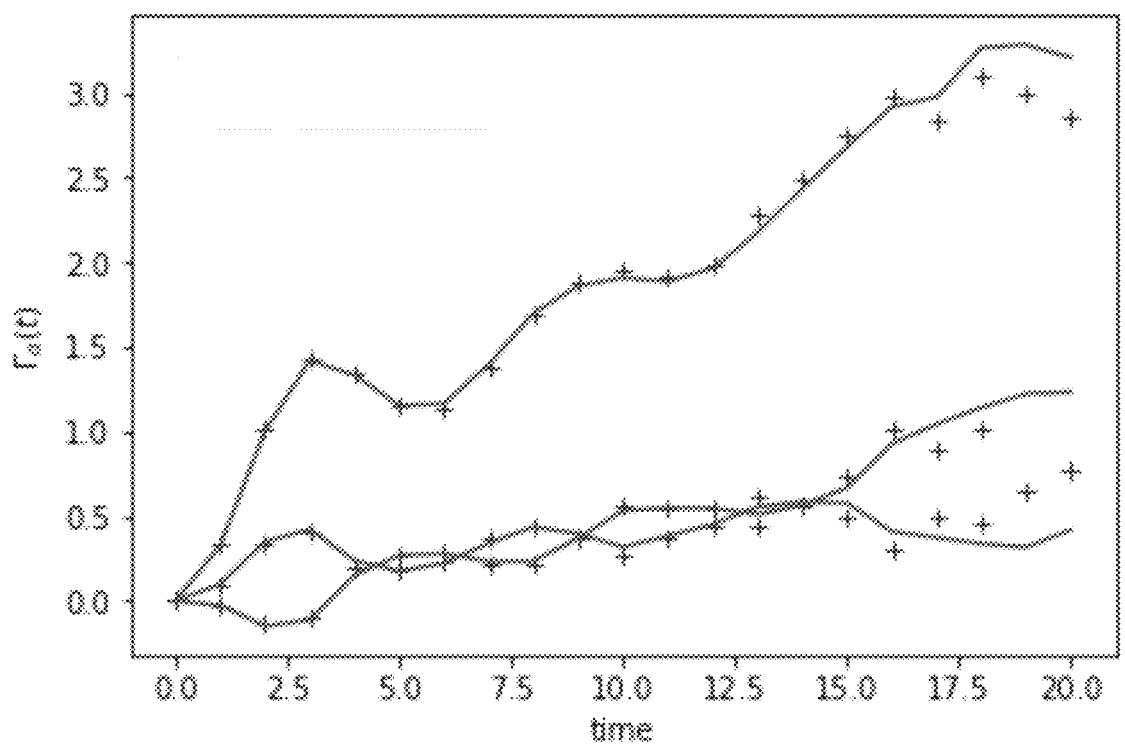
FIG. 8b is a schematic diagram of a non-Markovian noise intensity of another quantum noise process changing with time in an application embodiment of this application.

For example, FIG. 8a and FIG. 8b respectively show non-Markovian noise intensities, i.e., the RHP characterization values, of the non-Markovian quantum noise process that are determined by performing quantum noise process analysis on a non-Markovian and non-Pauli noise channel by using a standard Pauli basis (corresponding to FIG. 8a) and an optimal Pauli basis (corresponding to FIG. 8b), where the abscissa is the evolutionary moment, the ordinate is the RHP characterization value, and "+" is the RHP characterization value determined when Pauli rotation approximation is not used. Curves in FIG. 8a and FIG. 8b are respectively the RHP characterization values determined by Pauli rotation approximation using the standard Pauli basis and the optimal Pauli basis. It can be seen that in the case of a non-Pauli noise channel, the RHP characterization value determined by Pauli rotation approximation using the optimal Pauli basis can effectively restore the original characteristics of the quantum system.

Figure 9:
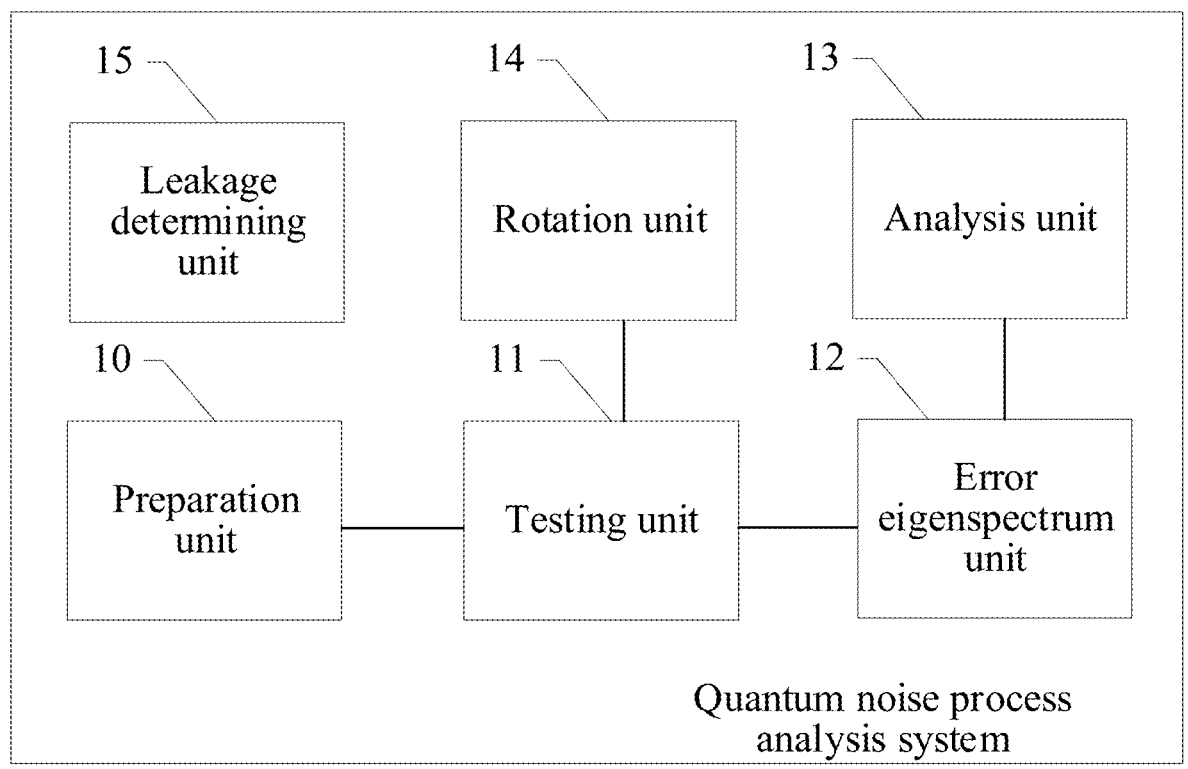
FIG. 9 is a schematic structural diagram of a quantum noise process analysis system according to an embodiment of this application.

The embodiments of this application further provide a quantum noise process analysis system. FIG. 9 is a schematic structural diagram of the system, which, for example, may include: a preparation unit 10, configured to prepare a set of quantum initial states; a testing unit 11, configured to respectively input the quantum initial states prepared by the preparation unit 10 into a plurality of first circuits to obtain a plurality of first quantum output states, the first circuits each including at least one noise evolution gate and a projection test gate corresponding to each noise evolution gate, and different first circuits including different numbers of noise evolution gates; an error eigenspectrum unit 12, configured to determine a dynamical map eigenspectrum including a first error according to a functional correspondence of the dynamical map eigenspectrum based on the quantum noise process between the plurality of first quantum output states obtained by the testing unit 11 and the quantum initial states; the testing unit 11 being configured to respectively input the prepared quantum initial states into a plurality of second circuits to obtain a plurality of second quantum output states, the second circuits each including at least one noise evolution gate and a dual projection test gate corresponding to each noise evolution gate, and different second circuits including different numbers of noise evolution gates; the error eigenspectrum unit 12 being further configured to determine a dynamical map eigenspectrum including a second error according to a functional correspondence of the dynamical map eigenspectrum based on the quantum noise process between the plurality of second quantum output states and the quantum initial states; and an analysis unit 13, configured to determine the dynamical map eigenspectrum of the quantum noise process according to the dynamical map eigenspectrum including the first error and the dynamical map eigenspectrum including the second error that are determined by the error eigenspectrum unit 12.

In some embodiments, the testing unit 11 is further configured to, at each evolutionary moment of a plurality of evolutionary moments, respectively input the prepared quantum initial states into the plurality of first circuits to obtain a plurality of first quantum output states at each evolutionary moment; and at each evolutionary moment of the plurality of evolutionary moments, respectively input the prepared quantum initial states into the plurality of second circuits to obtain a plurality of second quantum output states at each evolutionary moment.

In some embodiments, the analysis unit 13 is further configured to determine an eigenspectrum of a transfer tensor map according to the dynamical map eigenspectrum of the quantum noise process and a preset first correspondence, where the transfer tensor map is used for characterizing a dynamical evolution of a quantum noise process of a memory kernel based on a quantum system, and the memory kernel is used for characterizing a relationship between a current state and a previous state of the quantum system.

In some embodiments, the dynamical map eigenspectrum of the quantum noise process includes dynamical map eigenspectra of the quantum noise process at a plurality of evolutionary moments in a period of time; and the analysis unit 13 is further configured to predict dynamical map eigenspectra of the quantum noise process at evolutionary moments after the period of time according to the dynamical map eigenspectra of the quantum noise process at the plurality of evolutionary moments in the period of time, the eigenspectrum of the transfer tensor map, and the preset first correspondence.

In some embodiments, the analysis unit 13 is further configured to determine an eigenspectrum of a memory kernel of the quantum noise process according to the eigenspectrum of the transfer tensor map of the quantum noise process and a preset second correspondence, where the memory kernel is used for characterizing a relationship between a current state and a previous state of the quantum system.

In some embodiments, the analysis unit 13 is further configured to determine a correlation function of the quantum noise process according to the eigenspectrum of the memory kernel of the quantum noise process and a preset third correspondence; and determine a spectrum of the quantum noise process according to the correlation function of the quantum noise process.

In some embodiments, the analysis unit 13 is further configured to construct a non-Markovian noise model of the quantum noise process according to the dynamical map eigenspectrum of the quantum noise process, where the non-Markovian noise model is a model based on a decoherence rate of the quantum noise process; and determine a non-Markovian noise intensity of the quantum noise process based on the non-Markovian noise model of the quantum noise process.

In some embodiments, the preparation unit 10 is further configured to determine a plurality of candidate Pauli matrices, and prepare a set of candidate quantum initial states according to each of the candidate Pauli matrices; determine a non-Markovian noise intensity corresponding to each set of candidate quantum initial states prepared; and determine a maximum non-Markovian noise intensity in the non-Markovian noise intensities corresponding to the plurality of sets of candidate quantum initial states, and prepare a set of quantum initial states according to the candidate Pauli matrix corresponding to the maximum non-Markovian noise intensity.

In some embodiments, the quantum noise process analysis system may further include a rotation unit 14 configured to approximate a dynamical map of the quantum noise process by Pauli rotation, to retain a Pauli noise channel in quantum noise channels.

In some embodiments, the testing unit 11 is further configured to correspond to determine the dynamical map eigenspectrum including the first error according to a functional correspondence of a dynamical map eigenspectrum based on the Pauli noise channel retained by the rotation unit 14 between the plurality of first quantum output states and the quantum initial states; and determine the dynamical map eigenspectrum including the second error according to a functional correspondence of the dynamical map eigenspectrum based on the retained Pauli noise channel between the plurality of second quantum output states and the quantum initial states.

In some embodiments, the quantum noise process analysis system may further include a leakage determining unit 15 configured to, in a case that the quantum noise process is not a non-Markovian quantum noise process and a number of dynamical map eigenspectra of the quantum noise process exceeds a preset Hilbert space dimension of qubits, determining that qubit leakage occurs in the quantum system.

When the system of this embodiment analyzes the non-Markovian quantum noise process, the testing unit 11 inputs the prepared quantum initial state into a plurality of first circuits and a plurality of second circuits, respectively, to obtain a plurality of first quantum output states and A plurality of second quantum output states, and the error eigenspectrum unit 12 determines the dynamical map eigenspectrum including the first error and the dynamical map eigenspectrum including the second error, because the first circuit and the second circuit include If the number of projection test gates is different, the error caused by the analysis unit 13 in the evolution of the quantum initial state is also different (that is, the first error and the second error are different), so it can be based on the power including the first error The dynamical map eigenspectrum and the dynamical map eigenspectrum including the second error are obtained to obtain the dynamical map eigenspectrum with the error eliminated, so that the analysis of the quantum noise process is more accurate according to the dynamical map eigenspectrum with the error eliminated, and thus can be more accurate. More precise monitoring of the noise in the quantum system makes the regulation of the quantum system have precise pertinence.

Figure 10:
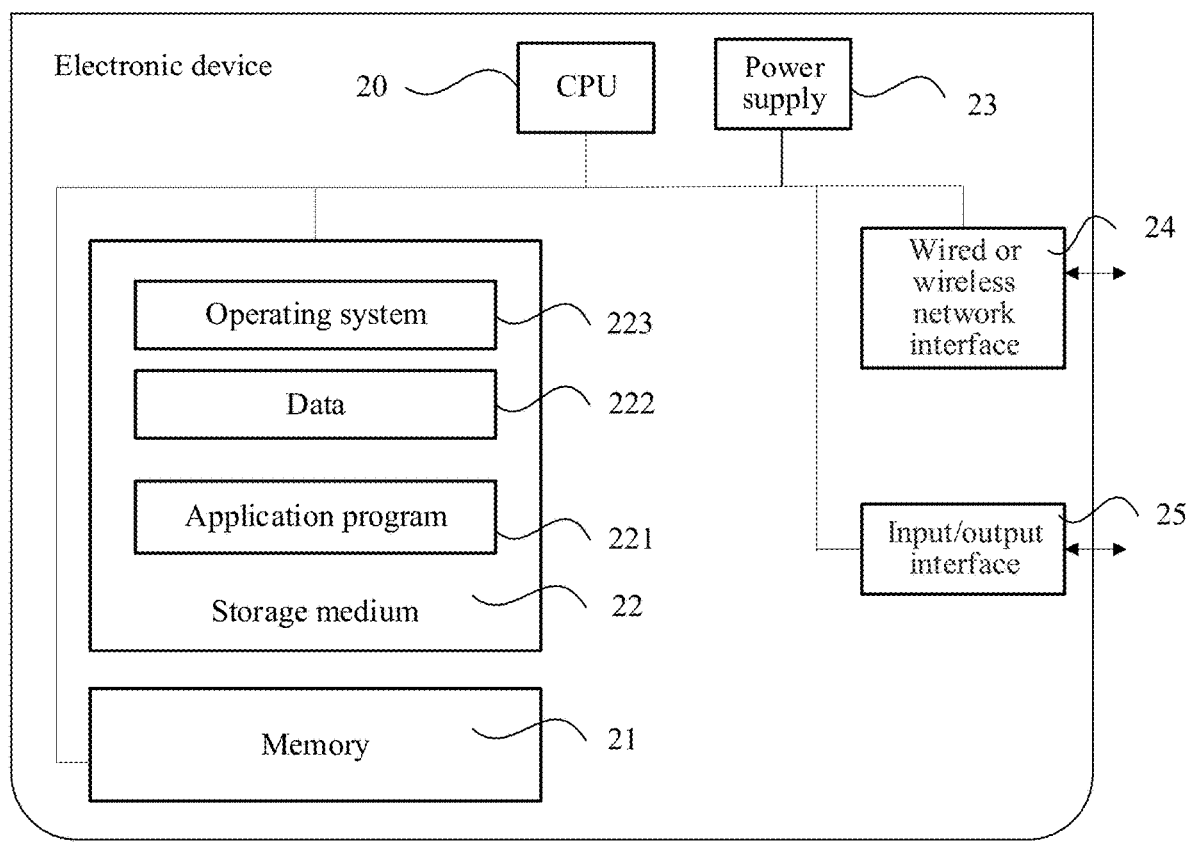
FIG. 10 is a schematic structural diagram of an electronic device according to an embodiment of this application.

The embodiments of this application further provide an electronic device. A schematic structural diagram of the electronic device is shown in FIG. 10. The electronic device may vary greatly due to different configurations or performance, and, for example, may include one or more central processing units (CPUs) 20 (for example, one or more processors), a memory 21, and one or more storage media 22 (for example, one or more mass storage devices) that store an application program 221 or data 222. The memory 21 and the storage medium 22 may be transient storage or permanent storage. The program stored in the storage medium 22 may include one or more modules/units (not shown), and each module/unit may include a series of instructions and operations for the electronic device. Further, the CPU 20 may be configured to communicate with the storage medium 22, and perform, on the electronic device, the series of instructions and operations in the storage medium 22.

For example, the application program 221 stored in the storage medium 22 includes an application program (computer program) for quantum noise process analysis, and the program may include the preparation unit 10, the testing unit 11, and the error eigenspectrum unit 12, the analysis unit 13, the rotation unit 14, and the leakage determining unit 15 in the quantum noise process analysis system, which will not be described in detail herein again. Further, the CPU 20 may be configured to: communicate with the storage medium 22; and perform, on the electronic device, a series of operations corresponding to the application program for quantum noise process analysis stored in the storage medium 22.

The electronic device may further include one or more power supplies 23, one or more wired or wireless network interfaces 24, one or more input/output interfaces 25, and/or one or more operating systems 223, for example, Windows Server™, Mac OS X™, Unix™, Linux™, or FreeBSD™.

The steps performed by the quantum noise process analysis system in the foregoing method embodiments may be based on the structure of the electronic device shown in FIG. 10.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

The embodiments of this application further provide a computer-readable storage medium, storing a computer program, the computer program being configured to be loaded by a processor to execute the quantum noise process analysis method executed by the foregoing quantum noise process analysis system.

The embodiments of this application further provide an electronic device including a processor and a memory, the memory being configured to store a computer program, and the processor being configured to execute the computer program stored in the memory to implement the quantum noise process analysis method executed by the foregoing quantum noise process analysis system.

A person of ordinary skill in the art should understand that all or a part of the steps of the methods according to the foregoing embodiments may be implemented by a program (computer program) instructing relevant hardware. The program may be stored in a computer readable storage medium, and the storage medium may include a read-only memory (ROM), a random access memory (RAM), a magnetic disk, or an optical disc.

The quantum noise process analysis method, system, storage medium, and electronic device provided in the embodiments of this application are described above in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification is not to be construed as a limitation to this application.

What is claimed is:

1. A quantum noise process analysis method, executed by an electronic device, the method comprising:
    preparing a set of quantum initial states;
    respectively inputting the prepared quantum initial states into a plurality of first circuits to obtain a plurality of first quantum output states, the first circuits each comprising at least one noise evolution gate and a projection test gate corresponding to each noise evolution gate, and different first circuits comprising different numbers of noise evolution gates;
    determining a dynamical map eigenspectrum comprising a first error according to a functional correspondence of a dynamical map eigenspectrum based on a quantum noise process between the plurality of first quantum output states and the quantum initial states;
    respectively inputting the prepared quantum initial states into a plurality of second circuits to obtain a plurality of second quantum output states, the second circuits each comprising at least one noise evolution gate and a dual projection test gate corresponding to each noise evolution gate, and different second circuits comprising different numbers of noise evolution gates;
    determining a dynamical map eigenspectrum comprising a second error according to a functional correspondence of the dynamical map eigenspectrum based on the quantum noise process between the plurality of second quantum output states and the quantum initial states; and
    determining the dynamical map eigenspectrum of the quantum noise process according to the dynamical map eigenspectrum comprising the first error and the dynamical map eigenspectrum comprising the second error.

2. The method according to claim 1, wherein the respectively inputting the prepared quantum initial states into a plurality of first circuits to obtain a plurality of first quantum output states comprises:
    at each evolutionary moment of a plurality of evolutionary moments, respectively inputting the prepared quantum initial states into the plurality of first circuits to obtain a plurality of first quantum output states at each evolutionary moment; and
    the respectively inputting the prepared quantum initial states into a plurality of second circuits to obtain a plurality of second quantum output states comprises:
    at each evolutionary moment of the plurality of evolutionary moments, respectively inputting the prepared quantum initial states into the plurality of second circuits to obtain a plurality of second quantum output states at each evolutionary moment.

3. The method according to claim 2, wherein the determining the dynamical map eigenspectrum of the quantum noise process according to the dynamical map eigenspectrum comprising the first error and the dynamical map eigenspectrum comprising the second error comprises:
    for each of the plurality of evolutionary moments, executing the following processing:
    determining the dynamical map eigenspectrum of the quantum noise process corresponding to the evolutionary moment according to the dynamical map eigenspectrum comprising the first error and the dynamical map eigenspectrum comprising the second error that correspond to the evolutionary moment.

4. The method according to claim 1, wherein the method further comprises:
    determining an eigenspectrum of a transfer tensor map according to the dynamical map eigenspectrum of the quantum noise process and a preset first correspondence, wherein the transfer tensor map is used for characterizing a dynamical evolution of a quantum noise process of a memory kernel based on a quantum system, and the memory kernel is used for characterizing a relationship between a current state and a previous state of the quantum system.

5. The method according to claim 4, wherein the dynamical map eigenspectrum of the quantum noise process comprises dynamical map eigenspectra of the quantum noise process at a plurality of evolutionary moments in a period of time; and the method further comprises:
    predicting dynamical map eigenspectra of the quantum noise process at evolutionary moments after the period of time according to the dynamical map eigenspectra of the quantum noise process at the plurality of evolutionary moments in the period of time, the eigenspectrum of the transfer tensor map, and the preset first correspondence.

6. The method according to claim 4, wherein the method further comprises:
    determining an eigenspectrum of a memory kernel of the quantum noise process according to the eigenspectrum of the transfer tensor map of the quantum noise process and a preset second correspondence.

7. The method according to claim 6, wherein the method further comprises:
    determining a correlation function of the quantum noise process according to the eigenspectrum of the memory kernel of the quantum noise process and a preset third correspondence; and
    determining a spectrum of the quantum noise process according to the correlation function of the quantum noise process.

8. The method according to claim 4, wherein the method further comprises:
in a case that the quantum noise process is not a non-Markovian quantum noise process and a number of dynamical map eigenspectra of the quantum noise process exceeds a preset Hilbert space dimension of qubits, determining that qubit leakage occurs in the quantum system.

9. The method according to claim 8, wherein the method further comprises:
determining a qubit leakage amount of the qubit leakage occurring in the quantum system according to leakage amounts of leakage between qubits in Hilbert subspaces of different levels.

10. The method according to claim 1, wherein the method further comprises:
constructing a non-Markovian noise model of the quantum noise process according to the dynamical map eigenspectrum of the quantum noise process, wherein the non-Markovian noise model is a model based on a decoherence rate of the quantum noise process; and
determining a non-Markovian noise intensity of the quantum noise process based on the non-Markovian noise model of the quantum noise process.

11. The method according to claim 10, wherein the preparing a set of quantum initial states comprises:
determining a plurality of candidate Pauli matrices, and preparing a set of candidate quantum initial states according to each of the candidate Pauli matrices;
determining a non-Markovian noise intensity corresponding to each set of candidate quantum initial states prepared; and
determining a maximum non-Markovian noise intensity in the non-Markovian noise intensities corresponding to the plurality of sets of candidate quantum initial states, and preparing a set of quantum initial states according to the candidate Pauli matrix corresponding to the maximum non-Markovian noise intensity.

12. The method according to claim 10, wherein the constructing a non-Markovian noise model of the quantum noise process according to the dynamical map eigenspectrum of the quantum noise process comprises:
constructing the non-Markovian noise model of the quantum noise process according to a correspondence between the dynamical map eigenspectrum of the quantum noise process and the decoherence rate of the quantum noise process.

13. The method according to claim 1, wherein before the determining a dynamical map eigenspectrum comprising a first error, the method further comprises:
approximating a dynamical map of the quantum noise process by Pauli rotation, to retain a Pauli noise channel in quantum noise channels.

14. The method according to claim 13, wherein the determining a dynamical map eigenspectrum comprising a first error according to a functional correspondence of a dynamical map eigenspectrum based on a quantum noise process between the plurality of first quantum output states and the quantum initial states comprises:
determining the dynamical map eigenspectrum comprising the first error according to a functional correspondence of a dynamical map eigenspectrum based on the retained Pauli noise channel between the plurality of first quantum output states and the quantum initial states; and
the determining a dynamical map eigenspectrum comprising a second error according to a functional correspondence of the dynamical map eigenspectrum based on the quantum noise process between the plurality of second quantum output states and the quantum initial states comprises:
determining the dynamical map eigenspectrum comprising the second error according to a functional correspondence of the dynamical map eigenspectrum based on the retained Pauli noise channel between the plurality of second quantum output states and the quantum initial states.

15. A quantum noise process analysis system, comprising:
a memory storing a computer program; and
a processor configured to execute the computer program, and upon execution of the computer program the processor is configured to:
prepare a set of quantum initial states;
respectively input the prepared quantum initial states into a plurality of first circuits to obtain a plurality of first quantum output states, the first circuits each comprising at least one noise evolution gate and a projection test gate corresponding to each noise evolution gate, and different first circuits comprising different numbers of noise evolution gates;
determine a dynamical map eigenspectrum comprising a first error according to a functional correspondence of a dynamical map eigenspectrum based on a quantum noise process between the plurality of first quantum output states and the quantum initial states;
respectively input the prepared quantum initial states into a plurality of second circuits to obtain a plurality of second quantum output states, the second circuits each comprising at least one noise evolution gate and a dual projection test gate corresponding to each noise evolution gate, and different second circuits comprising different numbers of noise evolution gates;
determine a dynamical map eigenspectrum comprising a second error according to a functional correspondence of the dynamical map eigenspectrum based on the quantum noise process between the plurality of second quantum output states and the quantum initial states; and
determine the dynamical map eigenspectrum of the quantum noise process according to the dynamical map eigenspectrum comprising the first error and the dynamical map eigenspectrum comprising the second error.

16. A non-transitory computer-readable storage medium, storing a computer program executable by a processor, and when executed by the processor is configured to cause the processor to:
prepare a set of quantum initial states;
respectively input the prepared quantum initial states into a plurality of first circuits to obtain a plurality of first quantum output states, the first circuits each comprising at least one noise evolution gate and a projection test gate corresponding to each noise evolution gate, and different first circuits comprising different numbers of noise evolution gates;
determine a dynamical map eigenspectrum comprising a first error according to a functional correspondence of a dynamical map eigenspectrum based on a quantum noise process between the plurality of first quantum output states and the quantum initial states;
respectively input the prepared quantum initial states into a plurality of second circuits to obtain a plurality of second quantum output states, the second circuits each comprising at least one noise evolution gate and a dual projection test gate corresponding to each noise evolution gate, and different second circuits comprising different numbers of noise evolution gates;

determine a dynamical map eigenspectrum comprising a second error according to a functional correspondence of the dynamical map eigenspectrum based on the quantum noise process between the plurality of second quantum output states and the quantum initial states; and determine the dynamical map eigenspectrum of the quantum noise process according to the dynamical map eigenspectrum comprising the first error and the dynamical map eigenspectrum comprising the second error.

* * * * *